United States Patent
Sze et al.

(10) Patent No.: US 11,503,307 B2
(45) Date of Patent: *Nov. 15, 2022

(54) SYSTEM AND METHOD FOR AUTOMATIC ENCODER ADJUSTMENT BASED ON TRANSPORT DATA

(71) Applicant: DEJERO LABS INC., Waterloo (CA)

(72) Inventors: David Pui Keung Sze, Waterloo (CA); Akos Horvath, Kitchener (CA); Bogdan Frusina, Kitchener (CA); Barry Gilhuly, Waterloo (CA); Cameron Kenneth Smith, Oakville (CA); Joseph Robert Wayne Mallet, Kitchener (CA); Anthony Todd Schneider, Waterloo (CA); Robert Flatt, Kitchener (CA); Hagen Kaye, Waterloo (CA)

(73) Assignee: DEJERO LABS INC., Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/316,012

(22) Filed: May 10, 2021

(65) Prior Publication Data
US 2021/0266569 A1 Aug. 26, 2021

Related U.S. Application Data

(63) Continuation of application No. 16/875,697, filed on May 15, 2020, now Pat. No. 11,006,129, which is a
(Continued)

(51) Int. Cl.
*H04N 19/134* (2014.01)
*H04N 19/166* (2014.01)
(Continued)

(52) U.S. Cl.
CPC .......... *H04N 19/166* (2014.11); *H04L 5/003* (2013.01); *H04L 5/0053* (2013.01);
(Continued)

(58) Field of Classification Search
CPC .. H04N 19/166; H04N 19/115; H04N 19/172; H04N 19/89; H04N 21/23406;
(Continued)

(56) References Cited

U.S. PATENT DOCUMENTS 5,301,242 A 4/1994 Gonzales et al.
5,365,552 A 11/1994 Astle
(Continued)

FOREIGN PATENT DOCUMENTS

CA 2505936 A1 5/2004
CA 2671266 A1 1/2011
(Continued)

OTHER PUBLICATIONS

European Search Report issued in European Application No. 15827758 dated Jan. 29, 2018.
(Continued)

*Primary Examiner* — Oanh Duong
(74) *Attorney, Agent, or Firm* — Norton Rose Fulbright Canada LLP

(57) ABSTRACT

A system and method for transmission of a video stream are provided. The system may include: an encoder adapted to generate a video stream comprising a plurality of encoded frames, encoded according to at least one encoding parameter; a comparator in communication with the encoder, the comparator adapted to compare encoded frames of the plurality of encoded frames with input frames to determine a fitness metric reflective of visual quality of the encoded frames; and a controller in communication with the com-
(Continued)

parator, the controller adapted to adjust the at least one encoding parameter based on the fitness metric.

20 Claims, 9 Drawing Sheets

Related U.S. Application Data continuation of application No. 16/195,415, filed on Nov. 19, 2018, now Pat. No. 10,701,370, which is a continuation of application No. 14/815,363, filed on Jul. 31, 2015, now Pat. No. 10,165,286, which is a continuation-in-part of application No. 14/341,057, filed on Jul. 25, 2014, now Pat. No. 10,033,779, and a continuation-in-part of application No. 13/439,352, filed on Apr. 4, 2012, now Pat. No. 9,585,062, which is a continuation-in-part of application No. 13/183,652, filed on Jul. 15, 2011, now Pat. No. 9,042,444, said application No. 14/341,057 is a continuation-in-part of application No. 12/499,151, filed on Jul. 8, 2009, now Pat. No. 8,873,560.

(60) Provisional application No. 62/031,407, filed on Jul. 31, 2014, provisional application No. 61/364,598, filed on Jul. 15, 2010.

(51) Int. Cl.

| | |
|---|---|
| *H04N 19/115* | (2014.01) |
| *H04N 19/172* | (2014.01) |
| *H04N 19/89* | (2014.01) |
| *H04L 5/00* | (2006.01) |
| *H04N 21/234* | (2011.01) |
| *H04N 21/2343* | (2011.01) |
| *H04N 21/44* | (2011.01) |
| *H04N 21/462* | (2011.01) |
| *H04N 21/61* | (2011.01) |
| *H04N 21/63* | (2011.01) |
| *H04N 21/6373* | (2011.01) |
| *H04N 21/6377* | (2011.01) |
| *H04N 21/658* | (2011.01) |
| *H04L 65/80* | (2022.01) |
| *H04L 65/70* | (2022.01) |
| *H04L 65/611* | (2022.01) |
| *H04L 65/613* | (2022.01) |

(52) U.S. Cl.
CPC .......... *H04L 5/0058* (2013.01); *H04L 65/611* (2022.05); *H04L 65/613* (2022.05); *H04L 65/70* (2022.05); *H04L 65/80* (2013.01); *H04N 19/115* (2014.11); *H04N 19/172* (2014.11); *H04N 19/89* (2014.11); *H04N 21/2343* (2013.01); *H04N 21/23406* (2013.01); *H04N 21/44004* (2013.01); *H04N 21/4622* (2013.01); *H04N 21/6131* (2013.01); *H04N 21/631* (2013.01); *H04N 21/6373* (2013.01); *H04N 21/6377* (2013.01); *H04N 21/658* (2013.01)

(58) Field of Classification Search
CPC ......... H04N 21/2343; H04N 21/44004; H04N 21/4622; H04N 21/6131; H04N 21/631; H04N 21/6373; H04N 21/6377; H04N 21/658; H04L 65/4076; H04L 5/003; H04L 5/0053; H04L 5/0058; H04L 65/4092

See application file for complete search history.

(56) References Cited

U.S. PATENT DOCUMENTS

| | | |
|---|---|---|
| 5,550,578 A | 8/1996 | Hoarty et al. |
| 5,566,208 A | 10/1996 | Balakrishnan |
| 5,579,239 A | 11/1996 | Freeman et al. |
| 5,845,088 A | 12/1998 | Lewis |
| 5,856,975 A | 1/1999 | Rostoker et al. |
| 5,872,784 A | 2/1999 | Rostoker et al. |
| 6,091,777 A * | 7/2000 | Guetz ................. H04N 19/635 375/240.03 |
| 6,108,382 A | 8/2000 | Gringeri |
| 6,111,913 A | 8/2000 | Murdock et al. |
| 6,115,420 A * | 9/2000 | Wang ................... H04N 19/126 375/E7.22 |
| 6,459,696 B1 | 10/2002 | Carpenter et al. |
| 6,567,533 B1 | 5/2003 | Rhoads |
| 6,665,872 B1 | 12/2003 | Krishnamurthy et al. |
| 6,754,295 B1 | 6/2004 | Hartnett |
| 6,834,044 B2 | 12/2004 | Sugirtharaj et al. |
| 6,999,511 B1 | 2/2006 | Boice et al. |
| 7,178,159 B1 | 2/2007 | Ando et al. |
| 7,295,608 B2 | 11/2007 | Reynolds et al. |
| 7,424,730 B2 | 9/2008 | Chou |
| 7,529,230 B2 | 5/2009 | Lewis et al. |
| 7,679,649 B2 | 3/2010 | Ralston et al. |
| 8,036,265 B1 | 10/2011 | Reynolds et al. |
| 8,094,713 B2 * | 1/2012 | Clark ................... H04L 43/0829 375/240.27 |
| 8,121,069 B2 | 2/2012 | Lewis et al. |
| 8,135,398 B2 | 3/2012 | Wang et al. |
| 8,175,404 B2 * | 5/2012 | Bichlmaier .......... H04N 17/004 382/250 |
| 8,250,618 B2 | 8/2012 | Rosenzweig et al. |
| 8,265,165 B2 * | 9/2012 | Park ....................... H04N 19/44 375/240.27 |
| 8,284,210 B1 * | 10/2012 | Kumar ..................... G09G 3/20 345/530 |
| 8,612,624 B2 | 12/2013 | Frueck |
| 8,619,602 B2 | 12/2013 | Begen |
| 8,639,260 B2 | 1/2014 | Fox et al. |
| 8,670,437 B2 | 3/2014 | Walker et al. |
| 8,683,542 B1 | 3/2014 | Henry |
| 8,823,772 B2 * | 9/2014 | Suh ....................... H04N 13/111 348/42 |
| 8,897,322 B1 | 11/2014 | Woleben |
| 9,106,787 B1 * | 8/2015 | Holmer ............... H04L 47/2416 |
| 10,165,286 B2 * | 12/2018 | Sze ..................... H04N 19/172 |
| 11,006,129 B2 * | 5/2021 | Sze ..................... H04L 65/607 |
| 2001/0024239 A1 | 9/2001 | Feder et al. |
| 2001/0039661 A1 | 11/2001 | Hua et al. |
| 2001/0047423 A1 | 11/2001 | Shao |
| 2002/0053075 A1 | 5/2002 | Paz et al. |
| 2002/0059643 A1 | 5/2002 | Kitamura et al. |
| 2002/0062482 A1 | 5/2002 | Bolle et al. |
| 2002/0101921 A1 | 8/2002 | Golin |
| 2002/0114332 A1 | 8/2002 | Apostolopoulos et al. |
| 2003/0011714 A1 | 1/2003 | Nevins |
| 2003/0118111 A1 | 6/2003 | Kim |
| 2003/0161311 A1 | 8/2003 | Hiironniemi |
| 2003/0185249 A1 | 10/2003 | Davies et al. |
| 2004/0016000 A1 | 1/2004 | Zhang et al. |
| 2004/0045030 A1 | 3/2004 | Reynolds et al. |
| 2004/0146211 A1 * | 7/2004 | Knapp ............... H04N 21/4341 375/E7.278 |
| 2004/0202249 A1 * | 10/2004 | Lo ......................... H04N 19/89 375/240.18 |
| 2004/0237104 A1 | 11/2004 | Cooper et al. |
| 2004/0255063 A1 | 12/2004 | Crinon et al. |
| 2005/0010960 A1 | 1/2005 | Kitazawa et al. |
| 2005/0060421 A1 | 3/2005 | Musunuri et al. |
| 2005/0073725 A1 | 4/2005 | Lim |
| 2005/0074061 A1 | 4/2005 | Ribas-Corbera et al. |
| 2005/0113066 A1 | 5/2005 | Hamberg |
| 2005/0163093 A1 | 7/2005 | Garg et al. |
| 2005/0175098 A1 | 8/2005 | Narasimhan et al. |
| 2005/0180415 A1 | 8/2005 | Cheung et al. |

(56) References Cited

U.S. PATENT DOCUMENTS

| | | |
|---|---|---|
| 2005/0210515 A1 | 9/2005 | Roh et al. |
| 2005/0259729 A1 | 11/2005 | Sun |
| 2006/0221933 A1 | 10/2006 | Bauer et al. |
| 2006/0224762 A1* | 10/2006 | Tian ................. H04N 19/126 709/231 |
| 2006/0244840 A1 | 11/2006 | Eshet et al. |
| 2007/0009045 A1 | 1/2007 | Mohandas |
| 2007/0021117 A1 | 1/2007 | McKenna et al. |
| 2007/0074251 A1* | 3/2007 | Oguz ................. H04N 19/649 375/E7.129 |
| 2007/0074266 A1* | 3/2007 | Raveendran ....... H04N 19/172 725/94 |
| 2007/0177579 A1 | 8/2007 | Diethorn et al. |
| 2007/0178932 A1 | 8/2007 | Miklos et al. |
| 2007/0199011 A1 | 8/2007 | Zhang et al. |
| 2007/0204318 A1 | 8/2007 | Ganesh et al. |
| 2007/0249422 A1 | 10/2007 | Podoloff |
| 2007/0263720 A1 | 11/2007 | He |
| 2008/0049630 A1 | 2/2008 | Kozisek et al. |
| 2008/0049650 A1 | 2/2008 | Coppage et al. |
| 2008/0091838 A1 | 4/2008 | Miceli |
| 2008/0101459 A1 | 5/2008 | Kwon et al. |
| 2008/0165861 A1* | 7/2008 | Wen .................. H04N 19/176 375/E7.176 |
| 2008/0170630 A1 | 7/2008 | Falik et al. |
| 2008/0196076 A1 | 8/2008 | Shatz et al. |
| 2008/0221918 A1 | 9/2008 | Petersen et al. |
| 2008/0278575 A1* | 11/2008 | Matsui ............... A61B 1/00009 348/72 |
| 2009/0061954 A1 | 3/2009 | Syed |
| 2009/0110060 A1 | 4/2009 | Cortes et al. |
| 2009/0147859 A1 | 6/2009 | McGowan |
| 2009/0168701 A1 | 7/2009 | White et al. |
| 2009/0216910 A1 | 8/2009 | Duchesneau |
| 2009/0247205 A1* | 10/2009 | Sennett ................ H04W 72/10 455/512 |
| 2009/0278941 A1 | 11/2009 | Smith et al. |
| 2009/0279483 A1 | 11/2009 | Falchuk et al. |
| 2009/0323803 A1 | 12/2009 | Gomila et al. |
| 2010/0016176 A1 | 1/2010 | Khvorova et al. |
| 2010/0036964 A1 | 2/2010 | Cedervall |
| 2010/0041397 A1 | 2/2010 | Chutorash et al. |
| 2010/0054329 A1 | 3/2010 | Bronstein et al. |
| 2010/0080287 A1* | 4/2010 | Ali ...................... H04N 19/60 375/240.03 |
| 2010/0082810 A1 | 4/2010 | Patel et al. |
| 2010/0082834 A1 | 4/2010 | Joung et al. |
| 2010/0142421 A1 | 6/2010 | Schlicht et al. |
| 2010/0142477 A1 | 6/2010 | Yokota |
| 2010/0161761 A1* | 6/2010 | Yu ...................... H04N 21/8456 709/219 |
| 2010/0189089 A1 | 7/2010 | Lynch et al. |
| 2010/0192212 A1 | 7/2010 | Raleigh |
| 2010/0195741 A1* | 8/2010 | Chou ................. H04N 21/2402 375/240.26 |
| 2010/0197288 A1 | 8/2010 | Camilleri et al. |
| 2010/0232498 A1* | 9/2010 | Liu .................... H04N 19/196 375/240.03 |
| 2010/0316066 A1 | 12/2010 | Leung |
| 2011/0002376 A1 | 1/2011 | Ahmed et al. |
| 2011/0051807 A1* | 3/2011 | Liu .................... H04N 19/149 375/240.03 |
| 2011/0188567 A1 | 8/2011 | Blum |
| 2011/0249127 A1 | 10/2011 | Zhang |
| 2011/0295727 A1 | 12/2011 | Ferris et al. |
| 2012/0008560 A1 | 1/2012 | Lewis et al. |
| 2012/0260296 A1 | 10/2012 | Mallet et al. |
| 2012/0290688 A1 | 11/2012 | Nandakumar |
| 2012/0294355 A1 | 11/2012 | Holcomb et al. |
| 2013/0077501 A1 | 3/2013 | Krishnaswamy |
| 2013/0263200 A1 | 10/2013 | Li |
| 2013/0282917 A1* | 10/2013 | Reznik ................ H04L 65/80 709/231 |
| 2014/0250486 A1 | 9/2014 | Sze et al. |
| 2014/0321561 A1* | 10/2014 | Stec .................. G06T 7/11 375/240.26 |
| 2015/0011311 A1* | 1/2015 | Relan ................. A63F 13/61 463/31 |
| 2015/0036757 A1* | 2/2015 | Schink ............... H04N 19/86 375/240.29 |
| 2015/0057044 A1 | 2/2015 | Altman |

FOREIGN PATENT DOCUMENTS

| | | |
|---|---|---|
| CA | 2842098 A1 | 1/2012 |
| DE | 102004049705 A1 | 7/2005 |
| EP | 1748655 A2 | 1/2007 |
| EP | 2273715 A2 | 1/2011 |
| WO | 2010030489 A2 | 3/2010 |
| WO | 2012006744 A1 | 1/2012 |
| WO | 2012099762 A1 | 7/2012 |
| WO | 2013184374 A1 | 12/2013 |

OTHER PUBLICATIONS

Anonymous, "Peak Signal-to-Noise Ratio as an Image Quality Metric—National Instruments", Sep. 11, 2013, http://www.ni.com/white-paper/13306/en/.

Lin, W. et al., "Perceptual Visual Quality Metrics: A Survey", Journal of Visual Communication and Image Representation, vol. 22, No. 4, May 1, 2011.

Lee, S. et al., "High Quality, Low Delay Foveated Visual Communications Over Mobile Channels", Journal of Visual Communication and Image Representation, Academic Press, Inc., US, vol. 16, No. 2, Apr. 1, 2005, pp. 180-211.

European Examiner's Report issued in European Application No. 13775296.0 dated Jan. 24, 2018.

European Examiner's Report issued in European Application No. 15827758 dated Mar. 19, 2021.

Extended European Search Report issued in European Application No. 20208971 dated Nov. 30, 2020.

Canadian Office Action issued in Canadian Application No. 2,882,195 dated Feb. 13, 2020.

International Preliminary Report on Patentability issued in International Application No. PCT/CA2015/000448, dated Jan. 31, 2017.

International Search Report and Written Opinion issued in International Application No. PCT/CA2015/000448, dated Oct. 30, 2015.

United Kingdom Examination Report issued in UK Application No. 1302081.3, dated Jun. 19, 2014.

International Search Report issued in International Application No. PCT/CA2011/050437, dated Aug. 25, 2011.

International Search Report and Written Opinion issued in International Application No. PCT/IB2013/000690, dated Sep. 16, 2013.

United States Office Action issued in U.S. Appl. No. 13/446,825, dated Dec. 19, 2013.

United States Office Action Response filed in U.S. Appl. No. 13/446,825, dated Mar. 19, 2014.

United States Office Action issued in U.S. Appl. No. 14/680,476, dated Oct. 18, 2016.

European Search Report issued in European Application No. 16164092.5 dated Aug. 22, 2016.

United States Office Action issued in U.S. Appl. No. 14/616,060 dated Jul. 12, 2016.

Extended European Search Report issued in European Application No. 13775296.0, dated Oct. 29, 2015.

Extended European Search Report issued in European Application No. 15178347.9, dated Dec. 16, 2015.

Nguyen, T. et al., "Multiple Sender Distributed Video Streaming", IEEE Transactions on Multimedia, IEEE Service Centre, Piscataway, NJ, USA, vol. 6, No. 2, Apr. 1, 2004.

United States Office Action issued in U.S. Appl. No. 13/183,652, dated May 21, 2014.

United States Office Action issued in U.S. Appl. No. 14/815,363 dated Mar. 20, 2018.

United States Office Action issued in U.S. Appl. No. 14/815,363 dated Jan. 11, 2017.

(56) References Cited

OTHER PUBLICATIONS

United States Office Action issued in U.S. Appl. No. 13/439,352 dated May 26, 2016.
United States Notice of Allowance issued in U.S. Appl. No. 13/446,825 dated Jul. 18, 2014.
United States Notice of Allowance issued in U.S. Appl. No. 13/183,652 dated Jan. 22, 2015.
European Office Action issued in European Application No. 13775296.0, dated Jun. 27, 2018.
Texas Instruments, "OMAP(TM) 4 Mobile Applications Platform", Product Bulletin, 2011, Texas Instruments Incorporated.
Australian Examination Report issued in Australian Application No. 2015296746, dated Nov. 9, 2017.
European Office Action issued in European Application No. 10168544.4, dated Oct. 17, 2014.
Extended European Search Report issued in European Application No. 10168544.4, dated Jun. 8, 2011.
Hsu, C-Y. et al., "Rate Control for Robust Video Transmission Over Burst-Error Wireless Channels", IEEE Journal on Selected Areas in Communication, May 1999, vol. 17, issue No. 5.
Response to European Search Report filed in European Application No. 10168544.4, dated Apr. 23, 2012.
European Office Action issued in European Application No. 10168544.4, dated May 24, 2012.
Response to European Office Action filed in European Application No. 10168544.4, dated Nov. 30, 2012.
European Office Action issued in European Application No. 10168544.4, dated Sep. 24, 2013.
Response to European Office Action filed in European Application No. 10168544.4, dated Jan. 24, 2014.
United States Office Action issued in U.S. Appl. No. 12/499,151 dated Oct. 12, 2011.
United States Office Action issued in U.S. Appl. No. 23/499,151, dated May 22, 2012.
United States Office Action issued in U.S. Appl. No. 23/499,151, dated Dec. 21, 2012.
United States Office Action issued in U.S. Appl. No. 23/499,151, dated Jun. 21, 2013.
United States Office Action issued in U.S. Appl. No. 23/499,151, dated Jan. 16, 2014.
Australian Examination Report issued in Australian Application No. 2010202903, dated Aug. 4, 2014.
Yang, L. et al., "Bi-Directional Entire Frame Recovery in MDC Video Streaming", Communications and Information Technology, 2005, International Symposium; IEEE International Symposium, Oct. 12-14, 2005, pp. 1023-1026, v2; Bejing, China.
Van-Dyck, R. et al., "Transport of Wireless Video Using Separate, Concatenated, and Joint Source-Channel Coding", IEEE Journal Magazine, Oct. 1999, pp. 1734-1750, vol. 87, issue 10, P.A., U.S.A.
Manish, J. et al., "Path Selection Using Available Bandwidth Estimation in Overlay-Based Video Streaming", Lecture Notes in Computer Science—Networking 2007, Ad Hoc and Sensor Networks, Wireless Networks, Next Generation Internet; pp. 628-639, vol. 4479/2009; Springer Berlin/Heidelberg.
Toufik, A. et al., P2P Object-based Adaptive Multimedia Streaming (POEMS), Journal of Network and Systems Management, Sep. 2007, pp. 289-310, vol. 15, n. 3, Springer, New York, N.Y. U.S A.
Martini, M. et al., "Content Adaptive Network Aware Joint Optimization of Wireless Video Transmission", Communications Magazine, IEEE, Jan. 2007, pp. 84-90, vol. 45, issue 11, Toronto, Ontario, Canada.
Batra, P. et al., "Effective Algorithms for Video Transmission over Wireless Channels", Signal Processing, Image Communication, vol. 12, issue 12, Apr. 1998, pp. 147-166, Elsevier, Amsterdam.
Budagavi, M. et al., "Multiframe Video Coding for Improved Performance over Wireless Channels", Image Processing, IEEE Transactions, vol. 10, issue 2, Feb. 2, 2001, pp. 252-265, Dallas, Texas, U.S.A.
Zhang, Q. et al., "Network-Adaptive Scalable Video Streaming over 3G Wireless Network", Image Proceedings, 2001 International Conference, Oct. 7 to 10, 2001, vol. 3, pp. 579-582, Thessaloniki, Greece.
Wang, T-C. et al., "Low-Delay and Error Robust Wireless Video Transmission for Video Communications", IEEE Transactions on Circuits and Systems for Video Technology, vol. 12, issue 12, Dec. 2002, pp. 1049-1058, New York, N.Y., U.S.A.
Tesanovic, M. et al., "Enhanced MIMO Wireless Video Communication Using Multiple-Description Coding", Image Communication, vol. 23, issue 4, Apr. 2008, pp. 325-336.
Hsu, C-Y. et al., "Rate Control for Robust Video Transmission over Burst-Error Wireless Channels", IEEE Journal on Selected Areas in Communication, vol. 17, No. 5, May 1, 1999, Piscataway, New Jersey, U.S.A.
United States Office Action issued in U.S. Appl. No. 13/439,352, dated Nov. 2, 2015.
Australian Examination Report No. 1 issued in Australian Application No. 2019201095, dated Jan. 23, 2020.

* cited by examiner

SYSTEM AND METHOD FOR AUTOMATIC ENCODER ADJUSTMENT BASED ON TRANSPORT DATA

CROSS-REFERENCE TO RELATED APPLICATIONS

This application is a continuation of U.S. patent application Ser. No. 16/875,697, filed on May 15, 2020, which is a continuation of U.S. patent application Ser. No. 16/195,415 (now U.S. Pat. No. 10,701,370), filed on Nov. 19, 2018, which is a continuation of U.S. patent application Ser. No. 14/815,363 (granted as U.S. Pat. No. 10,165,286), filed Jul. 31, 2015, which claims the benefit of U.S. Provisional No. 62/031,407, filed on Jul. 31, 2014.

U.S. patent application Ser. No. 14/815,363 is a continuation-in-part of U.S. patent application Ser. No. 14/341,057 (now U.S. Pat. No. 10,033,779), filed on Jul. 25, 2014, which is a continuation-in-part of U.S. patent application Ser. No. 12/499,151 (now U.S. Pat. No. 8,873,560) filed on Jul. 8, 2009.

U.S. patent application Ser. No. 14/815,363 is also a continuation-in-part of U.S. patent application Ser. No. 13/439,352 (now U.S. Pat. No. 9,585,062) filed on Apr. 4, 2012, which is a continuation-in-part of U.S. patent application Ser. No. 13/183,652 (now U.S. Pat. No. 9,042,444) filed on Jul. 15, 2011, which claims the benefit of U.S. Provisional No. 61/364,598 filed on Jul. 15, 2010.

All of these references are hereby incorporated by reference in their entireties.

FIELD

The present disclosure relates generally to the transmission of data streams. More particularly, the present disclosure relates to automatic adjustment of data stream encoding parameters based on transport data.

BACKGROUND

Delivery of large quantities of continuous real-time data from a transmitter to a receiver is a complex problem. The data stream may be compressed and transmitted over one or more concurrently connected networks before arriving at a server where the operation is reversed, and the data stream recreated.

The problem is particularly challenging when the data stream requires a high data rate such as when the data stream is a high quality (e.g., broadcast quality) video stream.

The problem is also particularly challenging when the one or more connected networks include wireless links, as required, for example when the transmitter is a mobile transmitter.

In particular, existing wireless technologies such as satellite or microwave fixed link may return a (live) video stream to a studio, but may have shortcomings. For example, satellite or microwave fixed link may take extra time to set up, may be expensive, and once set up may have reduced mobility. These solutions may have dedicated channels and a fixed bandwidth that prevents stream failure; however, sporadic drop-outs due to weather/catastrophic failure are still possible, but may be infrequent.

Cellular networks are possible alternatives to satellite or microwave networks for sending data from a mobile transmitter. Cellular networks have broad coverage and are relatively inexpensive to access. However, cellular networks may have lower bandwidth, and may be prone to transmission errors, lag due to resource contention, signal fading and increased interference while moving.

Wi-Fi networks may provide higher bandwidth connections. However, Wi-Fi networks often have limited range and coverage, and may not be readily available to a mobile transmitter. Wi-Fi networks are also subject to interference.

Even when the networks are rated to transmit data at the bit rates required for real-time transmission of the data stream, maintaining the required bit rates is difficult. Available bandwidth may be reduced by many uncontrollable factors, such as physical objects causing interference, the weather, the contention that occurs when multiple devices share the same limited network resources, and so on. Such factors reducing available bandwidth may be unavoidable even when wired links (e.g., wired Ethernet) are used. Fluctuations in available bandwidth may cause concomitant fluctuations in transmission bit rates, and which may make it difficult to reliably transmit high quality audio and video data streams in real time.

SUMMARY

In accordance with one aspect, a system for transmission of a video stream is provided. The system may include: an encoder adapted to generate a video stream comprising a plurality of encoded frames, encoded according to at least one encoding parameter; a comparator in communication with the encoder, the comparator adapted to compare encoded frames of the plurality of encoded frames with input frames to determine a fitness metric reflective of visual quality of the encoded frames; and a controller in communication with the comparator, the controller adapted to adjust the at least one encoding parameter based on the fitness metric.

In one embodiment, the input frames may be provided to the comparator from a video capture device.

In another embodiment, the system may include a pre-processor that processes frames prior to encoding, and wherein the input frames are provided to the comparator from the pre-processor.

In yet another embodiment, the input frames may be scaled versions of frames captured by a video capture device.

In one embodiment, the system may include a transmitter adapted to transmit encoded frames over a network.

In another embodiment, the comparator applies at least one of Structural Simularity (SSIM), Peak Signal to Noise Ratio (PSNR), Mean Squared Error (MSE), Multi-Scale SSIM (MS-SSIM) to determine the fitness metric.

In still another embodiment, the at least one encoding parameter comprises one or more of a frame rate, an encoding rate and a frame size.

In one embodiment, the controller is adapted to adjust the at least one encoding parameter based on a complexity level of the video stream.

In another embodiment, the complexity level of the video stream is determined based on motion estimation analysis of the input frames of the video stream.

In accordance with another aspect, a method for transmitting a video stream is provided. The method may include: encoding a frame of the video stream according to at least one encoding parameter; comparing the encoded frame with an input frame to determine a fitness metric reflective of visual quality of the encoded frame; and adjusting the at least one encoding parameter based on the fitness metric.

In one embodiment, the method may further include encoding a further frame of the video stream according to the adjusted at least one encoding parameter.

In another embodiment, the method may further include capturing the input frame.

In yet another embodiment, the method may further include pre-processing the input frame, the pre-processing comprising scaling the input frame.

In one embodiment, the fitness metric is determined based on at least one of Structural Simularity (SSIM), Peak Signal to Noise Ratio (PSNR), Mean Squared Error (MSE), and Multi-Scale SSIM (MS-SSIM).

In another embodiment, the at least one encoding parameter comprises one or more of a frame rate, an encoding rate and a frame size.

In still another embodiment, the method may further include adjusting the at least one encoding parameter based on a correlated parameter.

In one embodiment, the correlated parameter is a packet loss rate.

In another embodiment, the method may further include adjusting the at least one encoding parameter based on a maximum bit rate.

In yet another embodiment, the method may further include adjusting the at least one encoding parameter based on a complexity level of the video stream.

In still another embodiment, the complexity level of the video stream is determined based on motion estimation analysis of the input frames of the video stream.

BRIEF DESCRIPTION OF THE DRAWINGS

Embodiments will now be described, by way of example only, with reference to the attached Figures, wherein.

DETAILED DESCRIPTION

Figure 1:
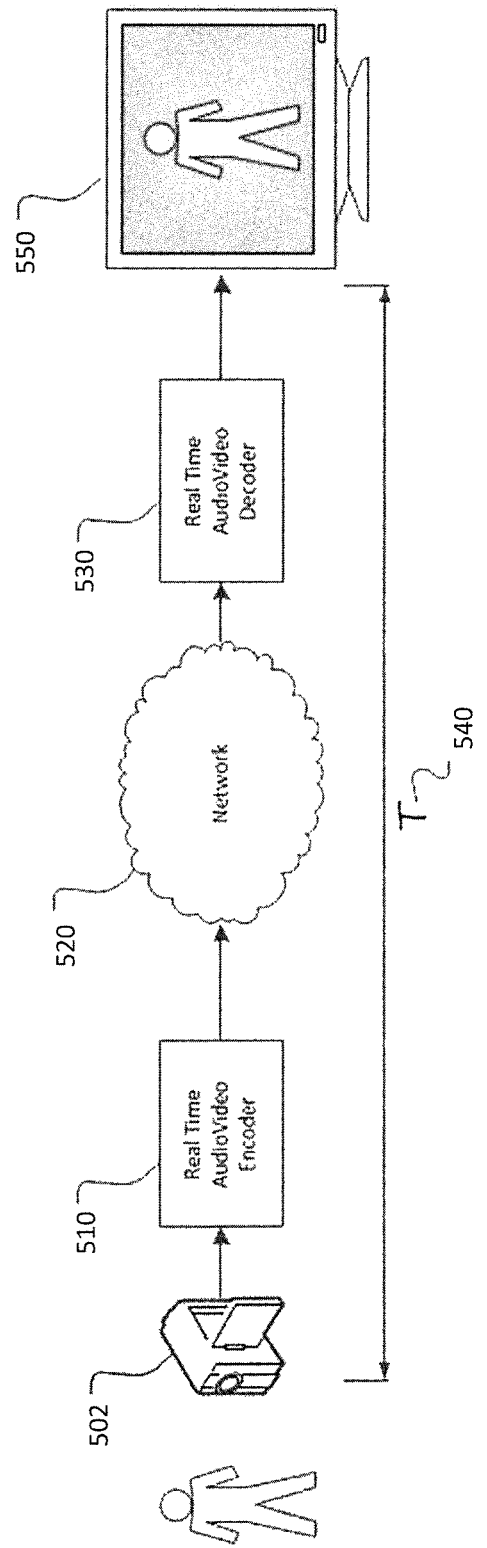
FIG. 1 is a block diagram of an example system for transmitting data streams.

Generally, embodiments of this disclosure relate to a method and system for maintaining improved level of continuity of a data stream when wireless transmission anomalies cause lost, corrupt or delayed data streams. The solutions described may, in some embodiments, be intended to compensate for lost, corrupt or delayed data streams which may result in audio and video images that are jumping, broken, corrupt and perhaps even unwatchable. In another aspect, the solutions described herein may, in some embodiments, be intended to maintain video quality when network transmission disruptions occur or when available bit rates otherwise fluctuate.

The problem with data transmissions can be further exacerbated when transferring broadcast quality video and ultra-high definition video data. In many instances continuity between audio and video frames can be important for the success of data being transferred. In a wireless environment, additional demands and challenges may require further methods for making video transmission viable.

This disclosure relates in particular to the problem of transmitting live, low latency audio and video data from a wireless mobile device. This problem differs from most previous work in this area, which has been focused on transmitting video data to mobile viewers. Different solutions may be required for transmitting audio and video from a wireless mobile device for at least two reasons. One, transmitting video to mobile viewers is expected to be lossy, with frames dropping out on a regular basis. Many consumer solutions rely on a single radio connection to the Internet. Two, bandwidth is asymmetrical, with the bandwidth down (to the mobile device) typically being many times the available bandwidth from the device. For example, representative numbers in some cases would be approximately 2 Mbps down, 300 Kbps up. This transmission of data from wireless mobile devices includes the transmission of large volumes of data that may be time critical, for example, data transmissions of either normal definition video (720 by 576), high definition video (1920 by 1080), or ultra high definition video (7680 by 4320). The transmission may also include unique environments like real-time news reporting, mobile news, reality television shows, sporting event coverage and a range of similar situation where the information gathered is dynamic and mobile. In these situations a wireless link to a wireless infrastructure may be used by many industries. Such wireless networks include general packet radio service (GPRS), enhanced data for global evolution (EDGE), universal mobile telecommunication system (UMTS), wideband code division multiple access (W-CDMA), long-term evolution (LTE), and many other 3G or 4G networks. Other wireless networks include WiFi, i.e. 802.11 technology (with all of its various standards), or a newer classes of wireless technologies that are intended to aid in delivering data such as television on demand and video conferencing on demand.

In this disclosure, the term video buffer is intended to refer to audio and video encoded data from a live source, for example a video camera, a high-definition mobile device such as a mobile phone with digital camera capabilities, tablet computers etc., or from a stored source like a disk or other storage media. Packaged information buffers for transmission over a wireless network will be referred to as V-Packets. Also in this disclosure the term mobile transmitter will refer to any sort of wireless mobile device being used to transmit information buffers to a destination.

FIG. 1 illustrates an example data transmission system. Video data is captured by a camera 502 or similar device. The captured data stream is passed to a real-time audio/video encoder 510. Encoder 510 encodes, in real time, the captured data stream. Encoding may include compressing the data stream, and optionally, encrypting the data stream. The encoded data stream is then directed, in real-time, across a communication network 520 to an intended receiver.

Communication network 520 may include one or more wired links, one or more wireless links, or any combination thereof. So, network 520 may simply include a wire between two devices. Network 520 may include radio frequency, cellular, WiFi, Ethernet, Satellite, fibre links, or the like, or any combination thereof. Some or all of the aforementioned links may be fixed/dedicated links. Network 520 may span private networks or the Internet.

The intended receiver may, for example, be a real-time audio-video decoder 530. Decoder 530 decodes, in real-time, the data stream received over network 520. Decoding may include decompressing, and if necessary, decrypting the received data stream. In an embodiment, the intended receiver may include one or more frame re-assembly modules as described later in this disclosure. The stream decoded by decoder 530 may be distributed downstream, or displayed on a connected monitor 550.

As illustrated, time T 540 is the time required for the captured video to be encoded, transported, and decoded, which may be referred to as the "glass-to-glass" latency.

Figure 2:
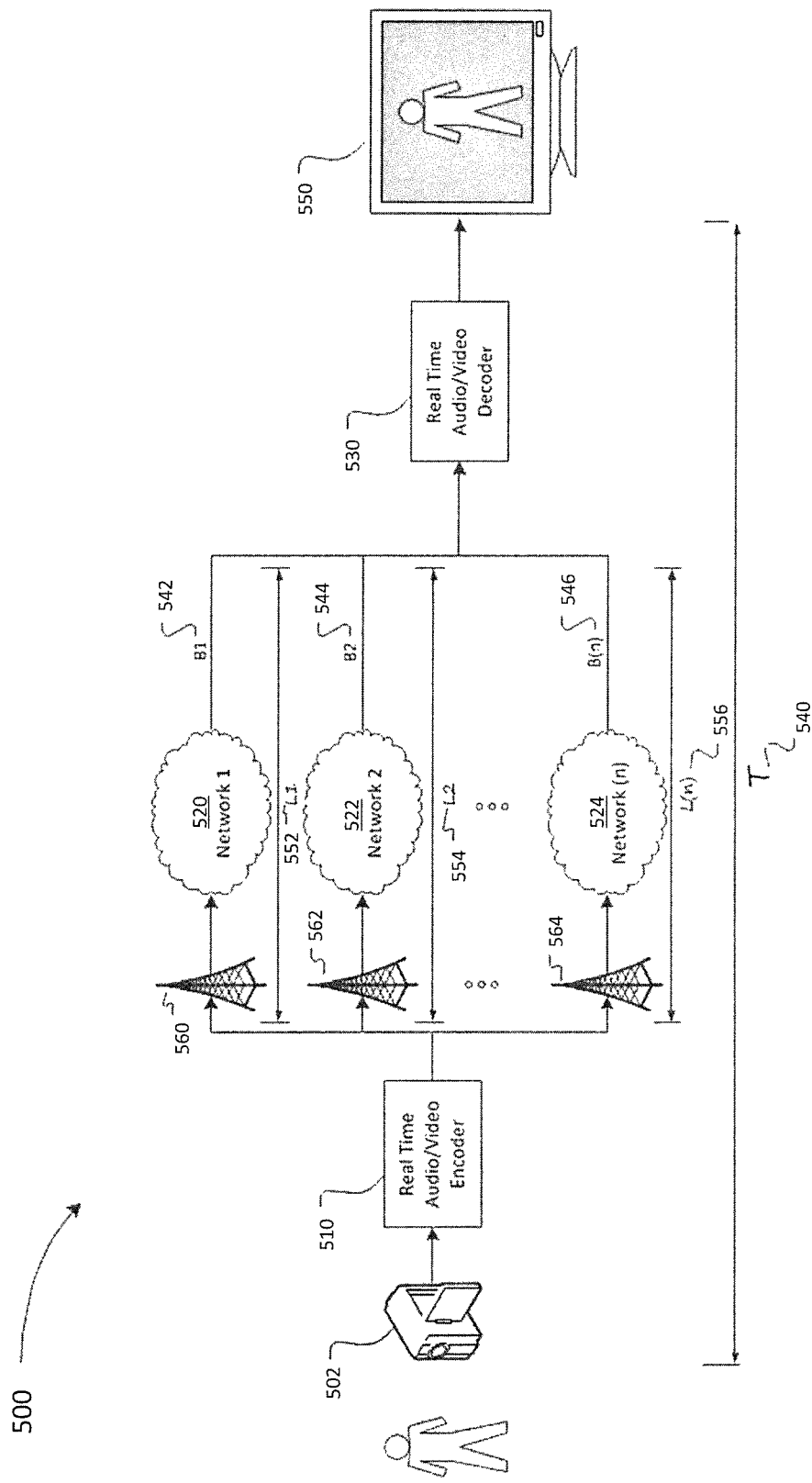
FIG. 2 is a block diagram of an example system for transmitting data streams using multi-path transmission.

FIG. 2 illustrates an example data transmission system that includes multiple connected networks. As shown, the system includes n connected networks, namely networks 520 (Network 1), 522 (Network 2) through 524 (Network n), each of which may be substantially similar to network 520 of FIG. 1. So, in an embodiment, each of networks 520 (Network 1), 522 (Network 2) through 524 (Network n) may be a wireless link between encoder 510 and decoder 530.

When a data stream has been encoded by encoder 510, the encoded data stream may be transmitted through multiple network interfaces 560 (Interface 1), 562 (Interface 2) through 564 (Interface n), over networks 520 (Network 1), 522 (Network 2) through 524 (Network n). Each of these networks may have its own characteristics and conditions, including available bandwidth, network latency, etc. For example, each network 520 (Network 1), 522 (Network 2) through 524 (Network n) may have a bandwidth Bn 542, 544 through 546, respectively, and a network latency Ln 552, 554 through 556, respectively. An embodiment may take into account these disparate characteristics to maximize overall throughput while providing an overall glass-to-glass latency T 540.

In some embodiments, the connected networks of FIG. 1 and FIG. 2 may each be a shared resource with access and availability shared with the many connected devices operated by the general public. As a result, available bandwidth and network latency may fluctuate during use. Even on networks with a defined quality of service, there may exist the possibility of service interruptions or delays. In embodiments described herein, the operation of encoder 510 may be automatically adjusted to take into account network conditions such as available bandwidth and latency. For example, in embodiments described herein, encoder 510 may adjust encoding parameters in response to changing network conditions. In some embodiments described herein, encoder 510 may also adjust encoding parameters in response to assessing video quality of an encoded video stream or in response to the incoming video stream.

Figure 3:
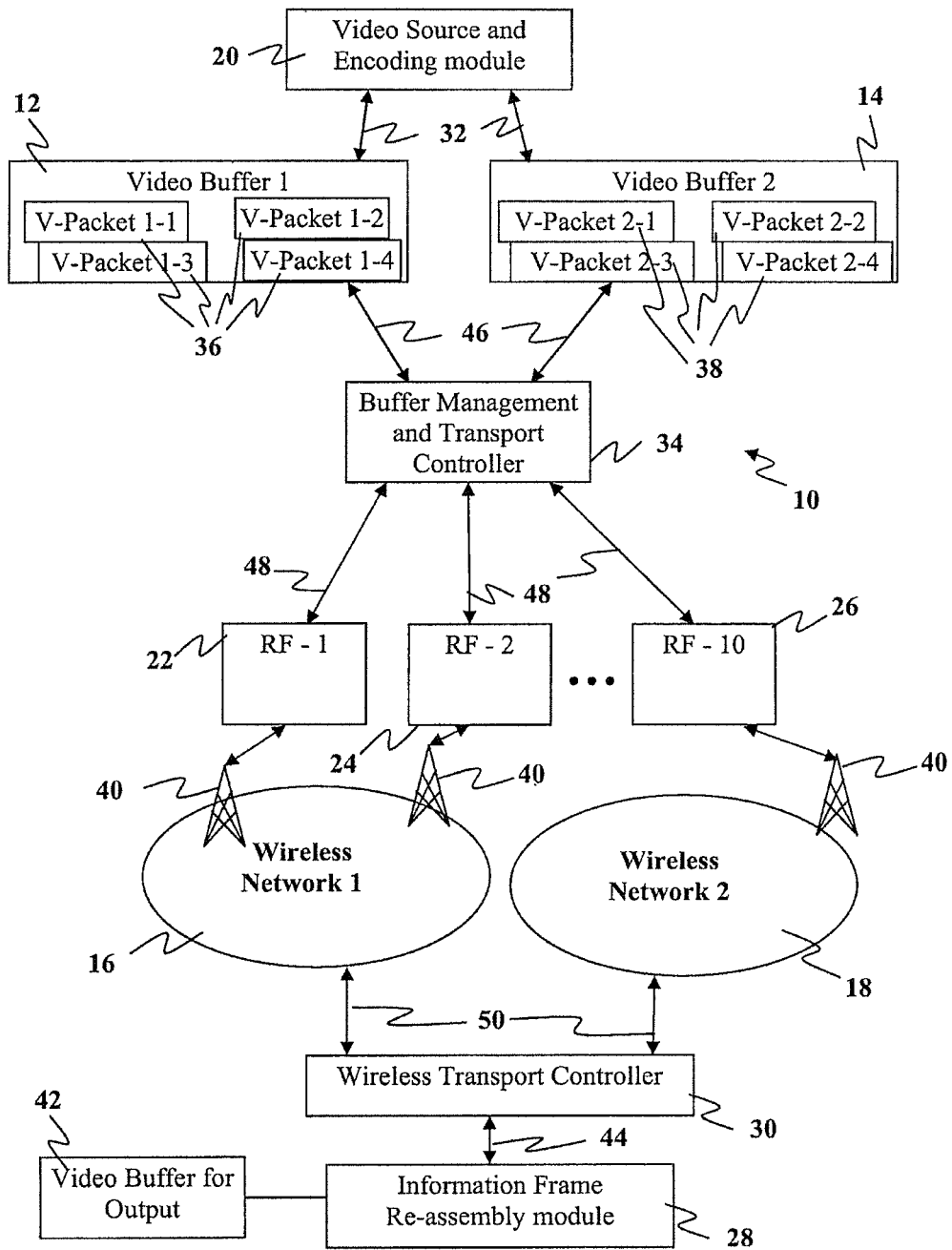
FIG. 3 is a block diagram of an example system for distributing video signals.

FIG. 3 illustrates a block diagram of an example data transmission system 10. As depicted, system 10 includes multiple information buffers 12, 14 and uses multiple wireless networks 16, 18 to transmit information. In situations and environments where information is preferably dynamically delivered from mobile locations or devices, a mobile sourced video solution is required. This information or mobile sourced video may have originated from cameras or some other advanced capture method or the information may have been pre-captured and saved to a storage media to be transferred at a later time. After preparing the video data into buffers 12, 14, a steady and continuous flow of buffers may be sent from a mobile transmitter to a receiver via various techniques. The system 10 provides the ability to modify the video quality at the source by adjusting the amount of video information encoded into the buffers 12, 14 at the transmitter as described herein. Video quality can be dynamically adjusted (improved or degraded) in response to feedback from the network both locally and remotely, such as, for example, local queues at the transmitter or the remote receiver.

In the system 10 of FIG. 3, the video source data is prepared for transmission and moved into the video buffers 12, 14 by the Video Source and Encoding module 20, which may contain a storage component used to store data or video information. Many video buffers could be used and the data may be divided between the various buffers. Captured information can include, for example, normal, high or extremely high definition audio and video content. Preparation may include advanced compression (for example moving picture expert group (MPEG) compression), packetization and other processes designed to improve transmission. In some embodiments, video data from a single source, either live or stored, can be divided into different packets for transmission. Other techniques can also be used to break the video data stream into different packets for delivery over various links. The division of the data is intended to allow for wireless delivery of data in multiple video buffers 12, 14 over one or more wireless network links, (Radio Frequency-1 (RF-1) 22, RF-2 24 and RF-10 26) over one or more wireless networks 16, 18 to an Information Frame Re-assembly component 28, via a wireless transport controller 30. Each of the processes shown can be executed within one or more computer systems and the division of labor between computer systems may be based on processing unit utilization and network capacity restrictions. Depending on conditions and processing unit availability, a complex video splitting method or a simple packetization and splitting method could be used. Within this encoding stage, the number of frames-per-second (FPS) is determined and the output enables dynamic adjustment of the quantity of information that is placed into the video buffers 12, 14 and subsequently transmitted to the Information Frame Re-assembly component 28.

The linkage 32 between the Video Source and Encoding module 20 and the Video Buffers 12, 14 could be external, for example, over FireWire, a Universal Serial Bus (USB) link, Serial connection, Bluetooth, WiFi wireless link or some other high speed link. Alternatively, in a fully integrated system the Video Source and Encoding module 20 could be together with the Video Buffers 12 and 14 in the same physical housing.

The system 10 includes a Buffer Management and Transport controller 34 which acts as an interface to a plurality of Radio Frequency (RF) modules 22, 24 and 26. In FIG. 3 only three RF modules are illustrated as RF-1 22, RF-2 24 and RF-10 26, however any number of modules may be included depending on the system. The Buffer Management and Transport Controller 34 accesses and reads portions of data in the Video Buffers 12 and 14. The portions of data labeled as V-Packet 1-1 36 to V-Packet 2-4 38 are created based on various factors including, but not limited to, the packet size restrictions of the wireless networks 16 and 18, other packet transmission results, configuration parameters and other such guidance within the overall system architecture.

The Buffer Management and Transport Controller 34 receives messages from RF modules 22, 24 and 26. The RF modules 22, 24 and 26 can return messages from an Information Frame Re-assembly module 28, via the Wireless Transport Controller 30, from the Wireless Transport Controller 30, and from interactions with one or more Wireless Networks 16, 18 through base stations 40 that are within a coverage region.

These messages represent feedback on metrics relating to through-put, latency, coverage, congestion, transmission failures with each base station 40 during the process of trying to exchange messages. Such metrics may be measured at a transmission side of the network (e.g., measured at the RF modules 22, 24, or 26), at a receiving side of the network (e.g., measured at the Wireless Transport Controller 30 or at the Information Frame and Re-assembly module 28), or at intermediaries within the Wireless Networks 16 and 18 (e.g., routers, nodes, etc.). Metrics measured at such locations may be used alone or in any combination as feedback by the Buffer Management and Transport Controller 34.

In turn this information guides the Buffer Management and Transport Controller 34 to decide what quality of video information to packetize, how much information to send and through which RF modules 22, 24 and 26, and through which linkage 48.

Once information is received by the Information Frame Re-assembly module 28, the information is collected into a video buffer for output 42. This buffer could be within the same computer system as the Information Frame Re-assembly module 28 or it could be housed in a separate system through a well-known link, like USB, FireWire or some high speed transfer connection. Linkage 44 between the Wireless Transport Controller 30 and the Information Frame Re-assembly 28 could be over, for example, a high-speed computer bus (multiple CPUs in the same physical housing), or over gigabit Ethernet (TCP/IP) or some other well known coupling method. The wireless transport control has a further link 50, where it is linked to wireless networks within the coverage range. A further linkage is created between the Buffer Management and Transport Controller and the video buffers 46.

Figure 4:
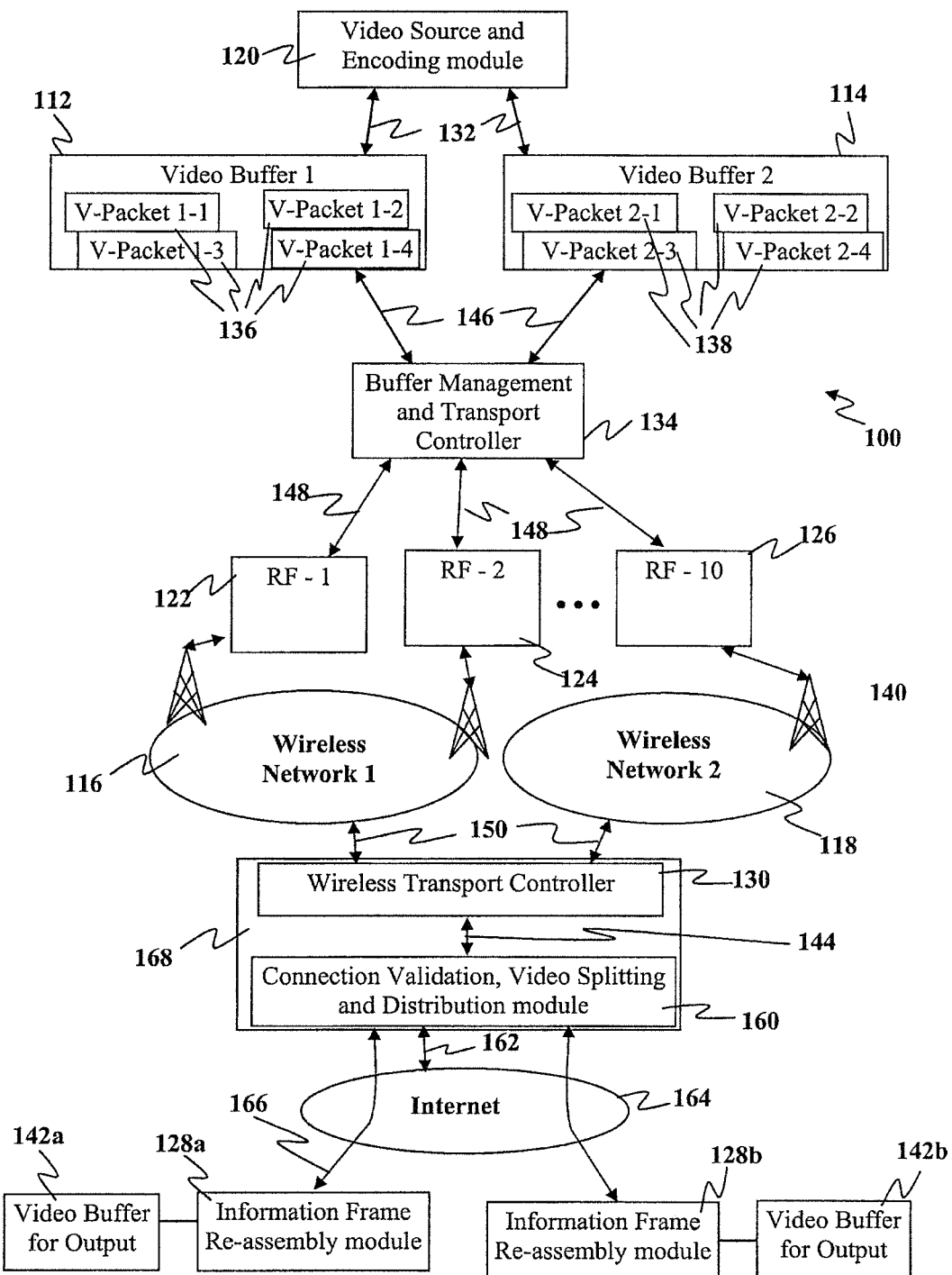
FIG. 4 is a block diagram of an example system.

FIG. 4 illustrates a block diagram of another example system 100 with multiple Video Buffers 112, 114 using multiple wireless networks 116, 118 to transmit, via a link 150, the video information to a distribution point 168 where it can be split for distribution. In this embodiment a Wireless Transport Controller 130 is coupled with a Connection Validation, Video Splitting and Distribution Module 160 (referred to as a Distribution module 160), via a link 164. The Distribution module 160 acts as a central hub for dealing with the distribution of Video Buffers 112, 114 to a large number of possible Information Frame Re-Assembly components 128a, 128b. This distribution point 168 is coupled to a wide area network like the Internet 164 via any well known high-speed link 162 for example, network links running megabit or gigabit speeds (e.g. T1 lines or faster). The distribution point may be directed coupled to at least one Information Frame Re-assembly module through a link 166.

The Information Frame Re-assembly components 128a, 128b could include cable stations, news outlets, Internet content centers, streaming Internet distributors and a wide range of existing and future distribution options. The Information Frame Re-assembly component is also connected to a video buffer 142 which is adapted to output or display the video or other data. In FIG. 4, various elements of the system are consistent to FIG. 3, but the Wireless Transport Controller 130 is centralized in a way that allows received V-Packets 1-1 to 2-4 136, 138 to be split, distributed and seen by a wider audience over a wide area connection network like the Internet 164. Distribution over the Internet 164 allows for quick worldwide distribution of real-time data from mobile camera collecting news and real-time events throughout the world. Another advantage of this embodiment 168 is that connections can be authorized, paid for and validated at any time. This system may allow new distributions to be more easily added to existing content with less negative impact on the overall system. Connections between the Information Frame Re-assembly components 128a, 128b would take place using common TCP/IP based protocols 166, such as real-time streaming protocol (RTSP) and real-time messaging protocol (RTMP) or a custom approach using User Datagram Protocol (UDP), which are easily able to distribute audio and video content. Such distributions are well known in the industry and have far fewer problems than ensuring the reliability of the data reception over the Wireless Networks 116, 118 that were used to collect the data in the first place.

The centralized Information Frame Re-assembly component allows for remote management and control of the mobile unit. In addition to status information, the central control pushes configuration instructions to the mobile unit, directing operation, which input/output to use, general quality settings, etc. The central control is capable of remotely configuring both the directly connected for example the mobile transmitter or Buffer Management and Transport Controller 134, to the server and those that route through the central systems, for example Information Frame Re-assembly module 128a, 128b.

As in FIG. 3, a Video Source and Encoding module 120 contains data that is distributed to the video buffers 112, 114 through a link 132. The Buffer Management and Transport Controller 134 receives the buffers through a link 146 and distributes the data to a plurality of RF modules 122, 124 and 126. The RF modules 122, 124 and 126 transmit the data to a base station 140 on range of a wireless network 116.

Figure 5:
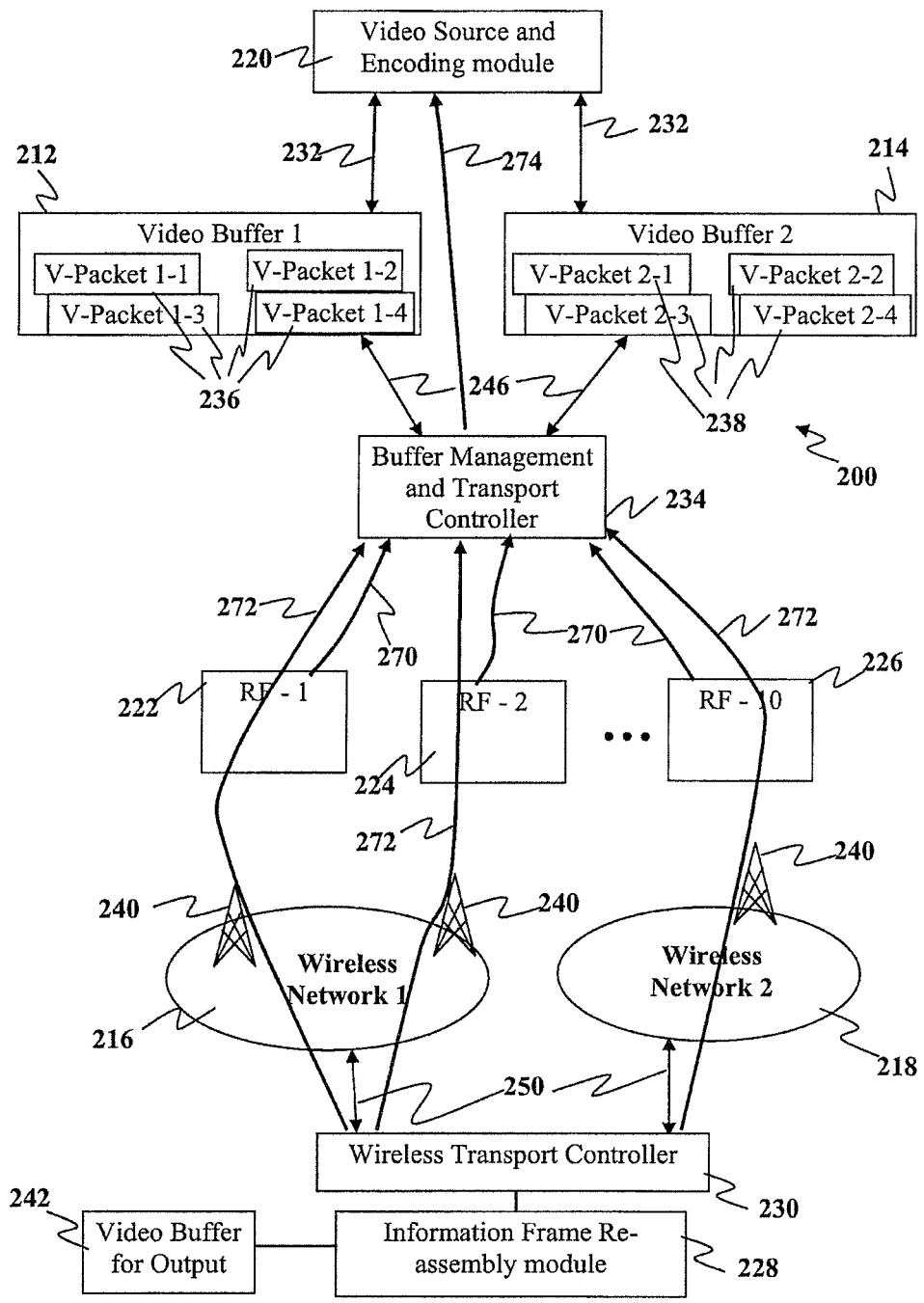
FIG. 5 is a block diagram of an example system and feedback that can occur within the system.

FIG. 5 illustrates a block diagram of yet another system 200 and the feedback that occurs within the system 200. The system has a video source encoding module 220 which relays video or other data via a link 232 to video buffers 212, 214. The system 200 further includes a Buffer Management and Transport Controller 234, which access the video buffers 212 and 214 trough a link 246, attempts to deliver V-Packets 1-1 to 2-4 236, 238 to an Information Frame Re-assembly module 228. Various failures and issues may take place along the delivery path. In an example system that uses Wireless Networks 216, 218 as part of the delivery path these failures may increase in frequency and seriousness as compared to a wired connection. In one case, the first set of failures may occur as all attached RF modules 222, 224, 226 attempt to wirelessly transmit the V-Packets 236, 238 to a specific base station 240. Base stations 240 experience frequency congestion issues, as the RF module 222, 224, 226 move, the coverage indications and receive signal strength indicator (RSSI) can show a degradation in link quality and its ability to receive the information. Errors due to spontaneous congestion may occur when an increase of wireless mobile devices wish to transmit at the same time. All of these failures, indicators and congestion issues result in the RF modules, i.e. RF-1 222, RF-2 224 and RF-10 226 sending signals 270 back to the Buffer Management and Transport Controller 234.

For V-Packets 236, 238 that make it across to the base station 240 there is still the transmission of information across the Wireless Network 216, 218. Within the Wireless Network 216, 218 an additional set of failures can occur. These failures can result from congestion issues within the Wireless Network 216, 218, lost packets, damaged packets that can not be understood and a range of other internal issues. As the Information Frame Re-assembly module 228 receives V-Packets 236, 238 it can infer which V-Packets 236, 238 did not make it across the Wireless Network 216, 218. The Buffer Management and Transport Controller 234 can also write a time stamp into each V-Packet 236, 238 just before it performs the transmission to the base station 240. This time stamp can then be used by the Information Frame Re-assembly module 228 to determine how long each V-Packet 236, 238 took to make it across the various hops to reach the base station. This one-way transmit time can then be used to determine if the Wireless Network 216, 218, the base station 240 or the link to the Wireless Network 250 is bottlenecked and may cause unusual delays in reception of the V-Packets 236, 238. This information and statistics regarding the transmission is collected by the Information Frame Re-assembly module 228 and transmitted back as a status message 272 to the Buffer Management and Transport Controller 234. Further status messages may be relayed similarly from the RF modules.

With all this status information 270, 272 returning to the Buffer Management and Transport Controller 234. The Buffer Management and Transport Controller 234 has the ability to make decisions intended to improve the overall continuity of V-Packet 236, 238 information flow over each attached RF Module 222, 224, 226. Since there can be any number of RF modules 222, 224, 226, this decision making ability can relate to specific feedback paths. For example throughput calculations for V-Packets 238, which could be sent through RF-10 226 into Wireless Network 2 218 and over link 250, could be taking ⅓ of the time for V-Packets 236 shipped over Wireless Network 1 (216). This information is taken into account when the Buffer Management and Transport Controller 234 merges all feedback information into a common feedback 274 to the Video Source and Encoding Module 220. The Video Source and Encoding Module 220 could be told to limit the amount of video buffer data 212, 214 it generates and stores into the buffer area. Image quality is reduced or degraded or it can be increased and improved in various different ways. Some of these ways include scaling down the image, as detailed below, which results in a generalized loss of quality over the entire frame, but may reduce or eliminate visible macroblocking. Alternatively the amount of video buffer 212, 214 can be reduced by decreasing the encoding bit rate, which tends to affect areas of higher movement or the frame rate can be decreased or increased. By adjusting the encoding and frame rates the number and quality of video images encoded changes, thus affecting the information encoded into the video buffer. A significant decrease in the encoding bit rate will eventually create a visibly degraded image at the receiving end.

Video that has been scaled down during encoding may be upsized to its original size (e.g., with missing pixel interpolated according to a scaling algorithm) by a decoder prior to display.

Scaling can be performed by Video Source and Encoding Module 220 before encoding the video data during pre-processing, as further detailed below. When scaling is performed during pre-processing, the number of bits allocated per pixel during the encoding process is increased. As a consequence, the image quality in the resulting output after decoding and upsizing may be improved compare to when scaling is not performed.

In one particular embodiment, Video Source and Encoding Module 220 applies scaling according to the following mapping of aggregate bit rate (available for data transmission over one or more network connections) to frame dimensions given an 1920×1080i29.97 fps input:

| Aggregate Bit Rate (Kbps) | Dimensions After Scaling |
| --- | --- |
| 0-500 | 320 × 180p29.97 fps |
| 300-1100 | 480 × 270p59.94 fps |
| 900-1700 | 640 × 360p59.94 fps |
| 1500-3000 | 960 × 540p59.94 fps |

In this particular embodiment, scaling is not applied when the aggregate bit rate is greater than 3000 Kbps. As shown in the above table, along with scaling, Video Source and Encoding Module 220 may also adjust the frame rate and whether the frames are interlaced based on the aggregate bit rate available for data transmission.

The Buffer Management and Transport Controller, as shown in FIGS. 3, 4 and 5, uses several factors to determine if the capacity of a particular RF channel has changed (either increased or decreased) including, but not limited to, network latency; connection RSSI; packet delivery failure; delivered bit rate compared to sent bit rate; and pending data (backlog).

In regard to network latency, the current network latency is measured by synchronizing the clocks at opposite ends of a network and continuously measuring the delay introduced by the network in delivering all packets. Once the latency is known, the Buffer Management and Transport Controller uses the information to determine whether an RF Connection is behaving well, compared to another connection or compared to the connection itself. For example, if the connection was compared with itself, the current network latency may be compared to the latency in the past X seconds, where X is a predetermined number used for the comparison. Conventional statistical techniques (for example, an exponentially decaying histogram) can also be used to develop a model for latency variation. A poorly performing connection may have a highly variable latency that increases as the traffic rate increases, or may have a latency that is simply too large for the channel to be useful, for example an approximately 2 second delay in short latency mode with a 1.5 glass-to-glass latency. For instance, each active audio/video stream has an associated end-to-end (or glass-to-glass) latency—the configured time delay between when the image was captured by the camera and when it is actually delivered to the video buffer for output. If the network delay of a particular RF interface increases significantly such that the glass to glass latency is threatened, that RF interface is either deprecated or shut down entirely to prevent the stream from being corrupted. This is particularly an issue for transmissions using an extremely short glass-to-glass latency, for example, less than approximately 2 seconds. Also, during transmission, if the network latency increases beyond a configured tolerance, it is also possible that the RF interface is sending more data than the network is capable of delivering, causing data to back up inside the RF interface/network. In this circumstance the Buffer Management and Transport controller may decrease the amount of data the RF interface/network is allowed to transmit. When the latency returns to normal, the Transport control may allow the RF interface to carry more data. The Buffer Management and Transport controller also uses the measured network delay to anticipate lost packets and retransmit them before the output video buffer misses them. If a packet hasn't been delivered and the time passed is longer than the network latency at the time that the RF interface sent it, the packet is considered lost. Also, if the packet is reported lost and the scheduled play time for the packet is close to the network delay of the fastest RF interface, in other words, the RF interface with the lowest network delay, the packet is assumed lost and resent.

Connection RSSI may aid in determining whether a specific channel is actually available.

Packet delivery failure is the rate at which packets are lost when sent via a particular RF interface. The status packets sent back to the Buffer Management and Transport Controller include statistics regarding the number of packets lost in a particular interval. The status packets also identify particular packets not received. These packets are resent in a timely manner to prevent the received stream from failing/breaking up due to missing information (a dropped frame). An increasing packet delivery failure rate is an indicator of an unstable/unreliable RF interface and the associated bit rate may be decreased.

In an alternative embodiment, a mechanism may instruct the network to allocate more bandwidth to the mobile device transmitting data. For example, in a network having a Quality of Service agreement, an indicator or trigger may be included that would indicate the desire to provide greater bandwidth for the ongoing transmission. This added mechanism may require further modification on the typical Quality of Service agreements currently in place.

Pending data (backlog) is the queue of packets awaiting transmission over any of the available RF interfaces. The Buffer Management and Transport controller monitors the current transmission rate of all connected/operating RF interfaces. The volume of data to be sent which would include continuous data generated by the source plus any packets that were detected/reported as lost. The presence of backlog does not necessarily require an immediate adjustment to the encoding bit rate by the Video Source and Encoding Module 220. For longer glass-to-glass latencies, the Information Frame Re-assembly Module 228 will have more audio/video data buffered, which gives the RF interfaces more time to attempt to clear the backlog without a reduction in encoding bit rate.

The audio encoding bit rate is much smaller relative to the flow of video information and is unlikely to have an impact on the system's ability to transmit a data stream. There may be little benefit in attempting to limit the audio signal bandwidth in order to preserve signal integrity. In one embodiment, the audio bitrate may be sent as a percentage of the total available through-put (bitrate) up to a pre-defined maximum (cap). In an alternative embodiment, the audio bitrate may be set as a fixed amount.

Many other factors could affect how the Buffer Management and Transport controller 234 sends status signals 274 onto the Video Source and Encoding module 220. The examples provided above are not meant to be exhaustive but representative of possible signals and failures to create feedback in the system. The Buffer Management and Transport controller may further include a storage component where information and other factors relating to the transmission are stored for later analysis.

Figure 6A:
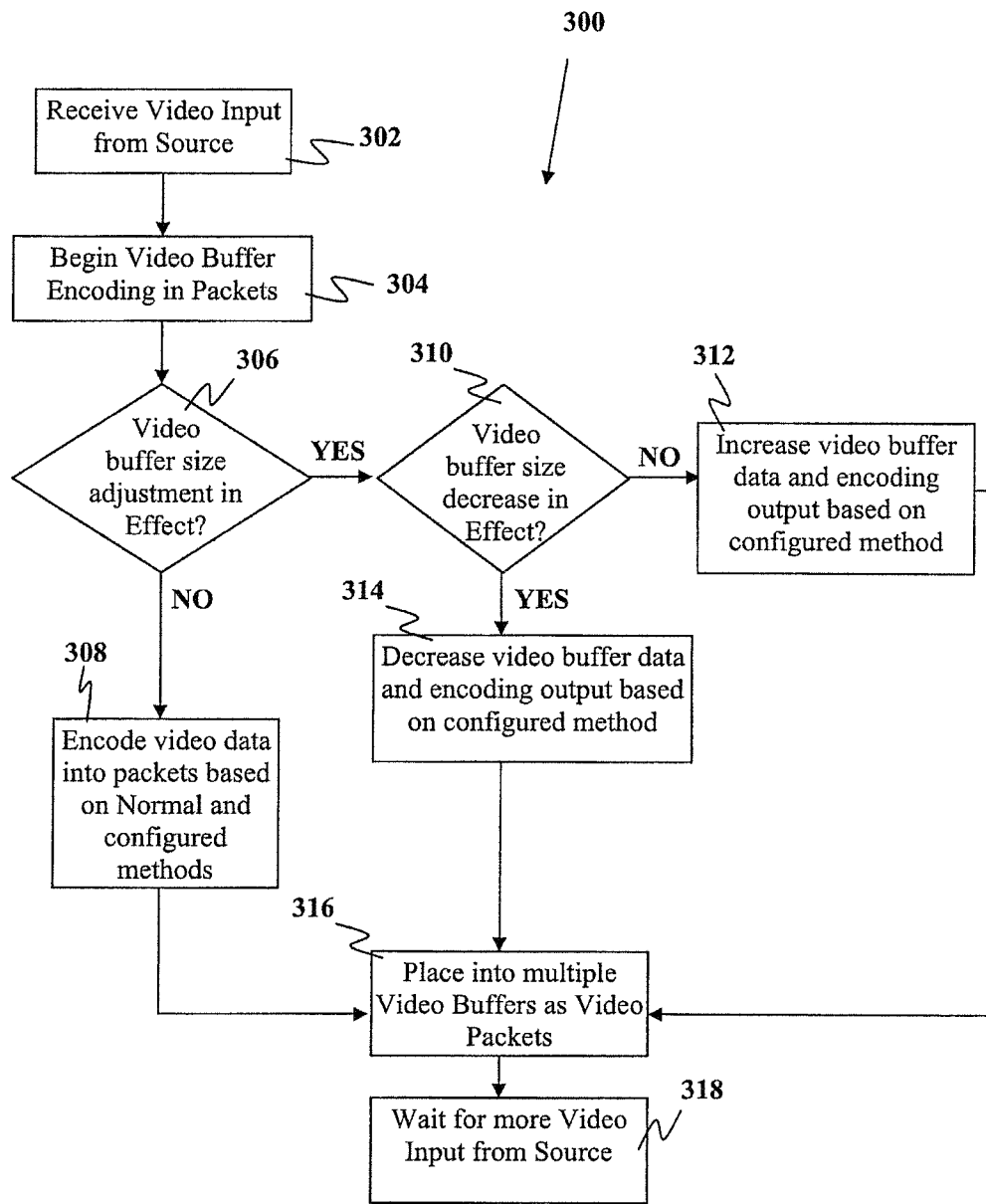
FIGS. 6A and 6B are flow charts showing an example method of video source scaling.
Figure 6B:
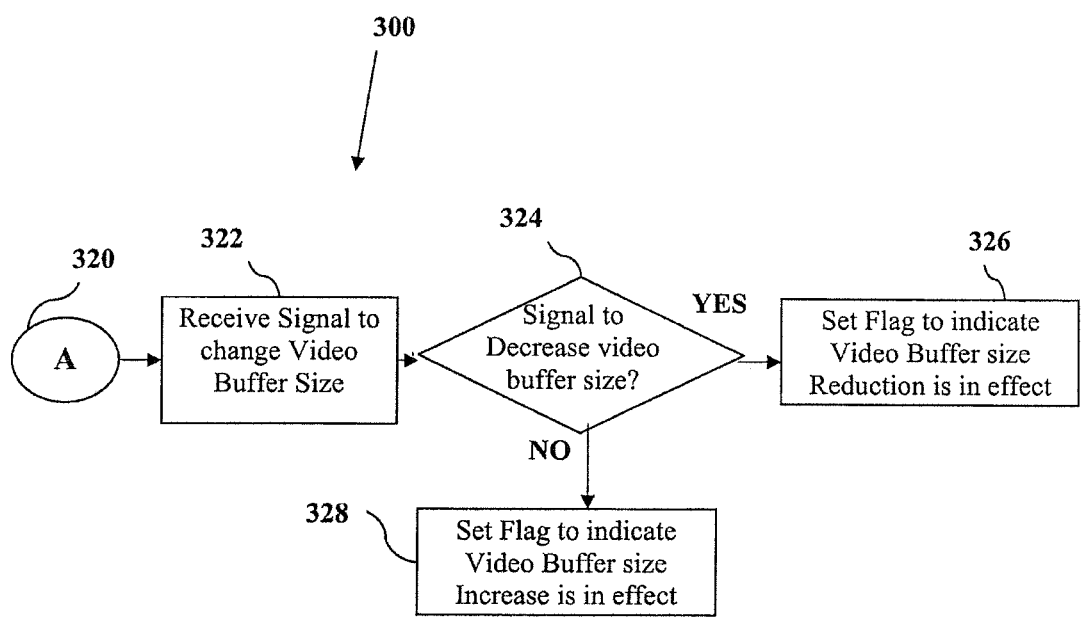

FIGS. 6A and 6B provide a flow chart showing aspects of example methods of video source scaling 300 within, for example, the Video Source and Encoding module. This flow chart may represent a small part of the overall functionality of the Video Source and Encoding module. Video input is received from a source 302. As described above, the video input can be from a range of different sources and can be broadcast quality video, high-definition, ultra-high definition or some further large sized video data. At the start of the process the video buffer encoding component 304 takes charge of the data and determines if there is any video buffer size adjustment in effect 306. Dynamic video size adjustment is an example method for increasing or decreasing the amount of data that must be transmitted wirelessly. If video buffer size adjustment is not in effect then regular encoding of the video data takes place 308 into video packets based on the normal and configured methods. As mentioned these methods include, for example, compression, for example, MPEG or other methods, encryption if required and packet splitting to move data through multiple video buffers for different Wireless Networks.

If video buffer size adjustment is in effect then a further check is performed to see if video buffer size should be decreased 310. A video buffer size decrease is not in effect then the video buffer encoding can be increased based on the buffer size adjustment flag. The amount of adjustment is based on the improvements in the parameters being monitored. These parameters can include measured latency and through-put, RSSI, base station saturation values, transmit failures, congestion values through the network, received latency by the remote receiver and many other similar parameters. When these values are analyzed against their previous values all improvements are compared and a determination is made using high and low water predetermined values. As values increase above thresholds then the amount of data can be increased. The method for increase 312 may follow the configured method used for decreasing the video buffer output. Methods to increase video image data quantity can include methods like: scaling up the image, which results in a generalized improvement of quality over the entire frame, by increasing the encoding bit rate, which tends to improve areas of higher movement, or the frame rate, can be increased. Additional methods include de-noising the image, de-interlacing the image (if the image is received at interlaced) or dynamically adjusting the color range of the image. These image modification techniques may be done by a pre-processing engine that precedes the video encoder or they may be incorporated as part of the video encoding step.

In one embodiment, the encoding bit rate, frame size or frame rate may be adjusted to increase or decrease the transmitted bit rate in response to changes in monitored parameters that may be correlated. For example, the bit rate and packet loss may be correlated. That is, pushing more data at a connection may result in increased packet loss at the connection. Accordingly, once an increase in packet failure or packet loss has been detected, an appropriate configured method may be applied to reduce the video image data quantity to reduce the transmitted bit rate.

If a video buffer size decrease is in effect 310 then the amount of data saved into video buffers is decreased 314. This decrease follows the configured method that is being used within the system. As discussed above, the method for decreasing can follow the configured method used for increasing the video buffer output. For example, decreasing video image data quantity can be done through decreasing of encoding bit rate. Other techniques may also be employed to improve perceived video quality at a lower encoded bit rate, including scaling down the image or reducing the frame rate. Methods such as scaling down the image, which results in a generalized decrease of quality over the entire frame, decreasing the encoding bit rate, which tends to negatively affect areas of higher movement, or decreasing the frame rate, may be used in combination to decrease the amount of data saved into video buffers.

Once the amount of encoded data is determined to be unadjusted 308, increased 312 or decreased 314, the data is then placed into multiple video buffers 316. Once the buffers are written the system for transmitting returns to wait for additional video data from the input source 318.

To assist in the determination of when to adjust video buffer output the Video Source and Encoding Controller receives a signal (A) 320 from the Buffer Management and Transport module. The received signal indicates a video buffer size change is required 322. A check is made to determine if the size should be decreased 324. If the size is to be decreased a flag or other indicator is set to indicate that the video buffer output should be reduced 326. Otherwise the flag is set to indicate that video buffer size should be increased 328.

Figure 7:
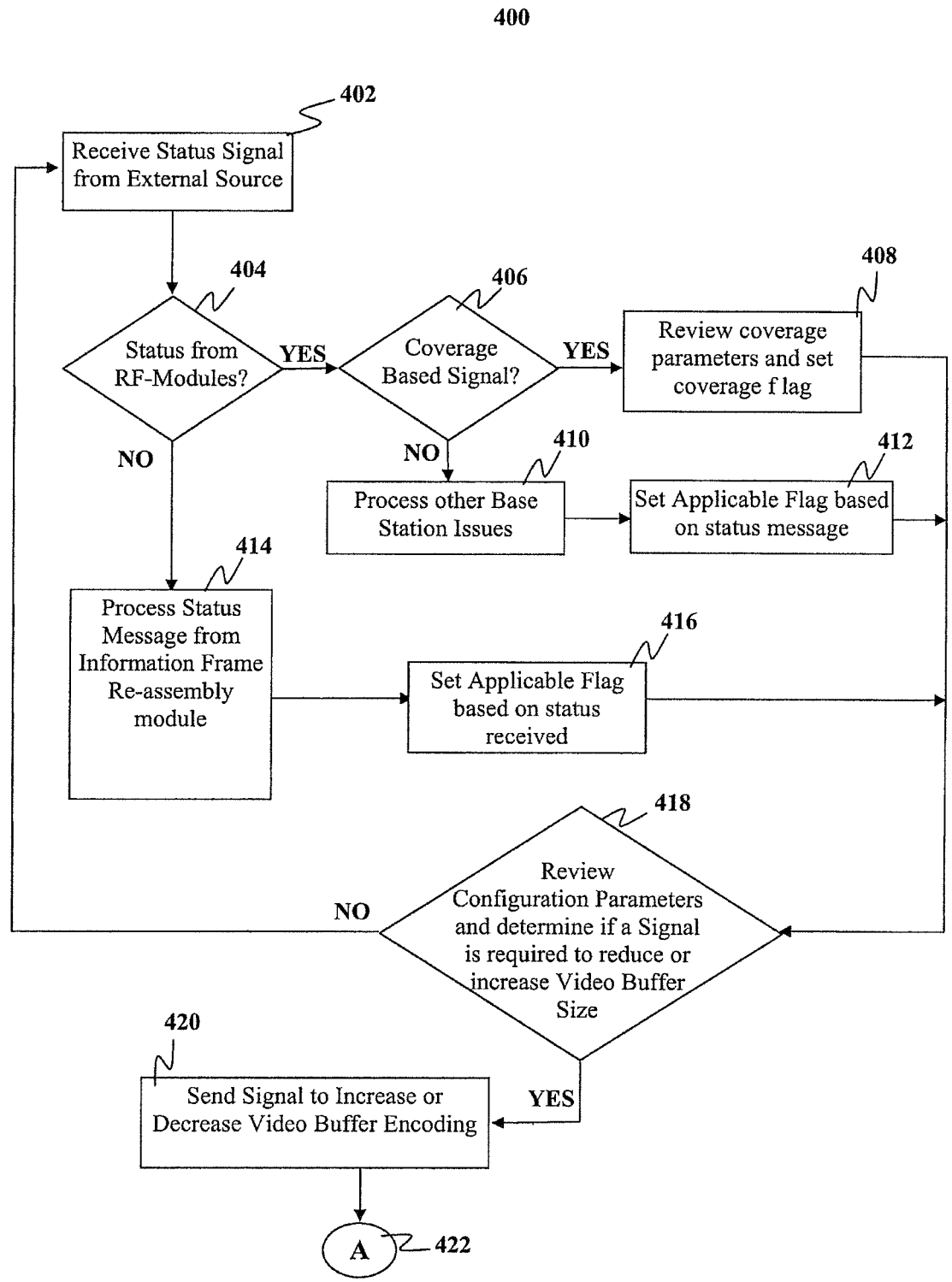
FIG. 7 is a flow chart showing an example method of video source scaling.

FIG. 7 provides a flow chart showing aspects of an example method of video source scaling 400 within the Buffer Management and Transport module. This flow chart represents only one aspect of the overall functionality of the Buffer Management and Transport module. First, the Buffer Management and Transport module receives status signal information 402 from an external source. As previously shown, these sources may be RF modules or remote wireless transport controllers. If the status is from an RF-Module 404 then various indicators are checked. There are other possible indicators only a few indicators are shown in this flow chart for readability. Status messages or indicators are feedback that can be related to the current (or active) video stream, client state, network state, remote server/network state and/or wireless status. Current video stream state messages include statistics related to, for example, the current transmission, including received bit rate, sent bit rate, lost packet rate, packet interval times, last sent time, clock status, bytes sent and received, buffer sizes, latency statistics, current length of buffered data, and the current glass to glass delay. Client state messages notify the Buffer Management and Transport controller of configuration changes in the central control. Network state information includes applying weighting to networks which may allow preferential treatment, for example, some networks may be preferred due to cost and/or business agreements. Remote server/network information includes statistics about the end-point, whether the remote IFR is in use, bandwidth limited, available resources, such as disk space and processing power, and other end point information. Wireless status includes information related to the general health of the connected wireless networks such as reliability, throughput, historical behavior, and configuration.

As an example, the coverage signal RSSI is checked 406 to see if the range has changed considerably. This check can be based on a previously saved value from this RF-Module, it can include a high and low water threshold change value, or that minor changes are ignored. If the coverage indicator has changed significantly for better or worse the coverage parameters are checked 408 and a flag is set to indicate whether the change is significant enough to require amending some transmission parameters. The flag might indicate the level has dropped considerably or has increased considerably, or separate indicators may be used.

If the signal from the RF-Module is not coverage related then a range of other possible base station issues are checked 410. This could include base station congestion factors, transmit failure attempts, dead zone indicators, base station handoff protocols in effect or other such wireless network anomalies. Once these are checked and analyzed the applicable flag is set 412 based on the status message and threshold levels. The flag could indicate conditions have improved or degraded.

If the status message is not from an RF-Module 404 then the status message may be from the Information Frame Re-assembly module. This status message could indicate a change in the receive frequency in video packets, either better or worse reception or it could indicate congestion issues have changed for better or worse, or it could indicate many other conditions have changed in packet reception, for example, lost packets, packet delivery rate, current network latency/delay, received bit rate (bps) synchronized with sent bit rate, etc.

Based on the status message and various threshold conditions the theoretical bandwidth of the RF connection is recalculated. If the aggregate calculated bandwidth for all connected RF connections has changed, the applicable flag is set to indicate an improvement or degradation of video buffer transfers 416.

Once this review of the status message is complete and the appropriate indicators have been set, a final review of the system changes is made 418. Within the final check all flags are reviewed against a preconfigured high or low water threshold mark to determine whether a sufficient change in the transmission by the system has been detected. Although a low-water and high-water threshold mark technique is discussed here many other methods could be used to determine whether the detected changes in video buffer transfers are significant enough to alter the video buffer output. For example, adaptive bit rate (ABR) may be used to determine an appropriate quality of streaming video frames and in turn, an appropriate quality of the video buffer output. Based on this determination a signal to increase or decrease the video buffer output is sent 420 to the Video Source and Encoding module and it connects through (A) 422 to FIG. 6.

In some embodiments, the Buffer Management and Transport Controllers described herein (e.g., Controllers 34, 134, or 234) may apply statistical analysis to feedback data, e.g., as received from any of the RF Modules described herein (e.g., RF modules 22, 24, 26, 122, 124, 126, 222, 224, or 226) or calculated at a Buffer Management and Transport Controller. For example, a Buffer Management and Transport Controller may apply statistical analysis on transmit rate, receive rate, instant network latency, averaged network latency, and other parameters to predict network performance (e.g., aggregate bandwidth available) based on feedback collected over time, e.g., over a pre-defined interval. Statistical analysis may include determining a mean, moving average, expected value of the noted parameters, or similar analyses.

Applying statistical analysis to feedback data to predict network performance reduces variability in predictions, such as predictions of aggregate bandwidth available. Consequently, such statistical analysis may also reduce variability in the determination of optimal video buffer sizes and variability in the bit rate of transmitted video data. Conveniently, reducing variability in the bit rate of transmitted video data may result in an overall higher video quality, as would be perceived by a user. However, applying statistical analysis may result in reduction of overall bit rate of transmitted video data. For example, brief increases in available aggregate bandwidth may not be fully utilized for the sake of maintaining a steadier bit rate.

Figure 8:
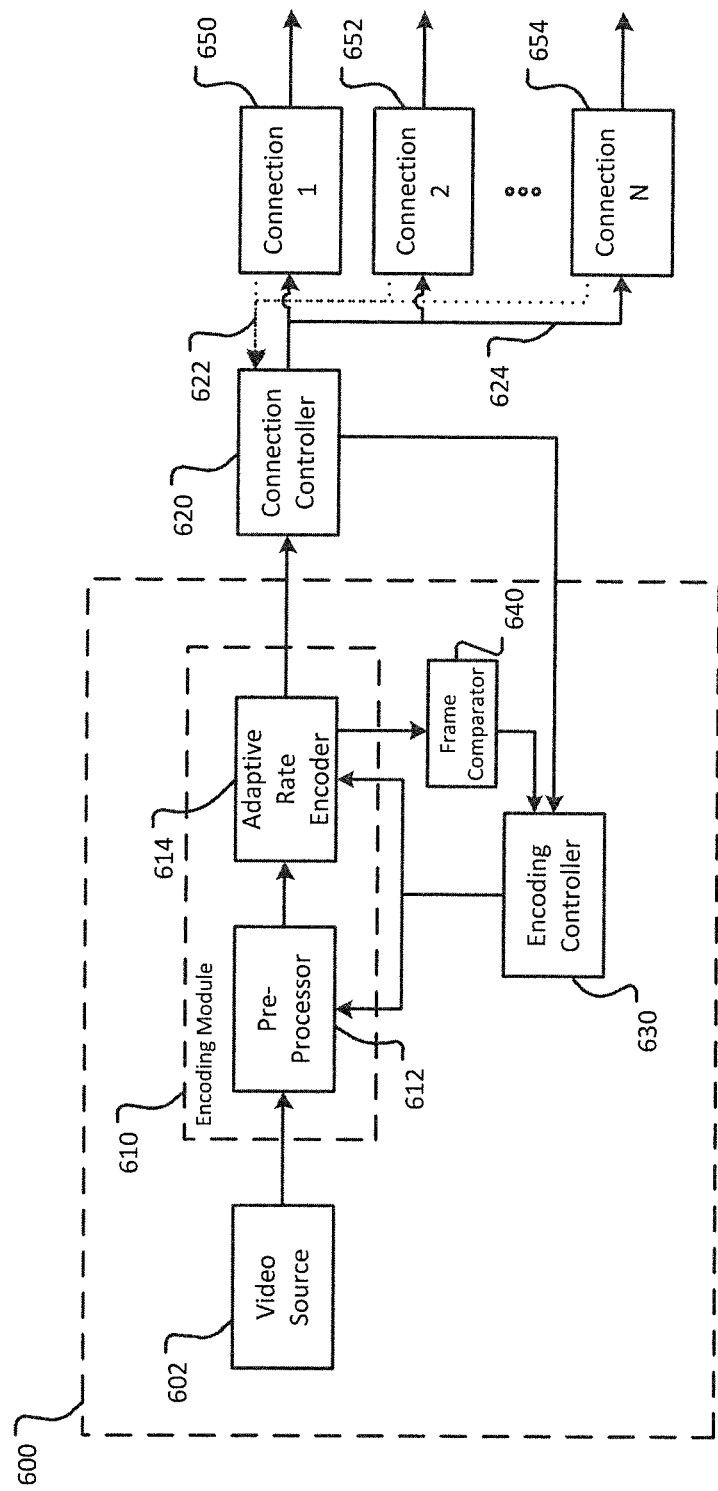
FIG. 8 is a block diagram of an example system that incorporates feedback regarding encoded video quality.

FIG. 8 illustrates an example data transmission system. As detailed herein, the system of FIG. 8 includes an encoder that dynamically adjusts encoding parameters during transmission of a video stream, where the adjustments are based not only on predicted network performance (e.g., predicted available bandwidth), but can be additionally or alternatively based on objective analysis of a visual quality of the encoded video stream. The objective analysis of the visual quality may be performed automatically without manual intervention. Conveniently, the system of FIG. 8 may be used to optimize the encoding parameters and resultant visual quality of a video stream for a given available transport bandwidth.

This system may be particularly advantageous when used in low bandwidth conditions, or when predicting available bandwidth conservatively (e.g., using statistical analysis as noted above), as may be desirable when a steady transmission bit rate is desired.

As depicted in FIG. 8, the system includes a Video Source and Encoding Module 600. Video Source and Encoding Module 600 includes Source 602, Encoding Component 610, Encoding Controller 630, and Frame Comparator 640.

Video data is captured by Source 602, which may be a video camera or similar device, and captured video data is delivered to Encoding Component 610.

Encoding Component 610 includes Pre-Processor 612 and Adaptive Rate Encoder 614, which perform pre-processing and encoding, respectively.

The Pre-Processor 612 formats the video stream for encoding, performing actions such as frame size scaling, frame rate adjustment, deinterlacing, noise filtering, or the like. Adaptive Rate Encoder 614 encodes the processed video stream using currently selected encoding parameters, as may be automatically selected in manners detailed below. Adaptive Rate Encoder 614 may employ any of the encoding methods and techniques disclosed herein, or other encoding methods and techniques known to those of ordinary skill in the art.

Video Source and Encoding Module 600 is otherwise similar to other Video Source and Encoding Modules described herein (e.g., Video Source and Encoding Modules 502, 510, 20, 120 or 220).

Encoded frames are passed to Connection Controller 620 for transport across connected networks 650, 652, 654. In some embodiments, Connection Controller 620 may include a Buffer Management and Transport Controller as described herein (e.g., Buffer Management and Transport Controllers 34, 134, or 234), and may include Video Buffers as described herein (e.g., Video Buffers 12, 14, 112, 114, 212, and/or 214).

Feedback data 622 from connected networks and from any local connections are returned to Connection Controller 620 where it is evaluated and an optimal maximum bit rate is derived (e.g., based on predicted available bandwidth). This maximum bit rate is passed to the Encoding Controller 630, detailed below.

Frame Comparator 640 receives encoded frames from Encoding Component 610 and compares the encoded frames with input frames to evaluate the visual quality of the encoded frames.

Frame Comparator 640 may compare encoded frames with input frames that are source frames produced by Video Source 602. Frame Comparator 640 may also compare encoded frames with input frames that are pre-processed frames, as produced by Pre-Processor 612 (but before encoding by Adaptive Rate Encoder 614).

Frame Comparator 640 may decode encoded frames to facilitate comparison. As such Frame Comparator 640 may include a decoder as disclosed herein (e.g., decoder 530). Frame Comparator 640 may rescale the decoded frame to its original size before comparing the decoded frame to the corresponding input frame.

Frame Comparator 640 may be configured to include and use various algorithms to compare frames, including, for example, Structural Similarity (SSIM), Peak Signal to Noise Ratio (PSNR), Mean Squared Error (MSE), Multi-Scale SSIM (MS-SSIM) or the like. The listed algorithms are examples only, and other conventional or proprietary algorithms may also be used in place or in conjunction with the listed algorithms. Upon applying such algorithms to compare frames, Frame Comparator 640 calculates a metric reflective of the evaluated visual quality of the encoded frame relative to the source frame, which may be referred to as a "fitness" metric. This fitness metric is provided to Encoding Controller 630, which uses the fitness metric as part of the feedback for selecting optimal encoding parameters.

In some embodiments, a combination of metrics may be used, each reflective of different aspects of visual quality of encoded frames.

In some embodiments, comparison by Frame Comparator 640 of the encoded frames with the pre-processed frames (as outputted by Pre-Processor 612) may be computationally less expensive as the encoding engine of Adaptive Rate Encoder 614 may include an evaluation of the encoded output fitness as a by-product of the encoding process, and the result of such evaluation may be used as the fitness metric or to simplify calculation of the fitness metric.

However, comparing the encoded frames with the pre-processed frames may possibly result in loss of comparative accuracy. In particular, pre-processing performed by Pre-Processor 612 may itself reduce the output frame quality, aside from any reduction in quality caused by encoding. The reduction in output frame quality during pre-processing may arise from loss of data when a video image is scaled down. For example, scaling a 1080p frame to 720p results in loss of data; when the 720p frame is scaled back to its original size, the lost data must be estimated (interpolated) and frame quality may be reduced. In some embodiment, comparing encoded frames with pre-processed frames would not account for such reduction in quality caused by pre-processing.

In an embodiment, Frame Comparator 640 may compare frames continually, e.g., every frame. In other embodiments, Frame Comparator 640 may compare frames periodically, e.g., every N-th frame, where N is a pre-determined parameter.

Encoding Controller 630 determines encoding parameters, including encoder and pre-processing parameters to be used by Pre-Processor 612 and Adaptive Rate Encoder 614, respectively, based at least in part on the current fitness metric provided by Frame Comparator 640 and the maximum bit rate (e.g., predicted bandwidth available) provided by Connection Controller 620.

Based on the maximum bit rate and the current fitness metric, Encoding Controller 630 may adjust the encoding parameters until the fitness metric provided by Frame Comparator 640 meets or exceeds a pre-defined minimum value. So, Encoding Controller 630 and Frame Comparator 640 may cooperate to adjust parameters iteratively until the fitness metric meets or exceeds the minimum value. In this way, the system optimizes visual quality of the encoded video for a given bit rate.

The minimum values used by Encoding Controller 630 may be defined with reference to a perceptual model. The model may be based on, for example, factors such as user feedback, heuristics, estimated error rates, etc. The model may also take into account the complexity of the video being encoded, e.g., whether or not the video contains fast motion, given that bit-rate required to encode video typically increases with the complexity of that video. For example, video containing only slow moving features (e.g., still shots, landscapes) requires a significantly lower bit-rate to encode than a comparable video (same length, resolution) with significant fast motion (e.g. sports).

In one embodiment, the Encoding Controller 630 may be configured to adjust encoding parameters based on a measurement of complexity level of the video stream, concurrently with or independent of the fitness metric evaluation by the Frame Comparator 640. The video stream may contain a plurality of video frames. The complexity level of the video stream may therefore depend on a complexity level associated with said plurality of video frames, such as adjacent or consecutive video frames. The frames under consideration may be the input frames from a video capturing device.

A measure of the complexity of the video may be determined and represented by an indicator. The indicator may be, in one example, user provided (e.g., when the video is known to be a live sports broadcast). For instance, the indicator may be a flag or a pre-determined value associated with the video stream that has been set to indicate that the video stream is a live sports broadcast.

In one embodiment, the complexity of the video may also be automatically determined, e.g., using conventional complexity estimation methods and techniques such as motion estimation methods and techniques.

In another embodiment, the complexity level of the video stream may be determined based on an analysis of the input frames of the video stream. For instance, the complexity analysis may be based on a motion estimation technique.

For example, a complexity analysis (e.g. via an implementation of motion estimation technique) of a number of video frames may determine that the frames involve high-motion between consecutive frames. In some embodiment, the high-motion (e.g. frequent and/or fast movement of pixels) may be introduced by camera motion; in other embodiments, the high-motion detected in frames may be attributed to moving objects in a captured video stream (e.g. sports event). Once a certain level (e.g. high, low, or medium) of motion is detected in the video frames, the complexity level may be then assigned an indicator accordingly. If this complexity level is high, it may lead to a higher minimum value that the fitness metric needs to meet. In addition, the Encoding Controller 630 may determine that the encoding parameters need to be adjusted based in part on the determined complexity level of the video stream, aside from the fitness metric.

In the case of a high complexity level of the video stream, or at least of a number of input frames in the video stream, the Encoding Controller 630 may determine that a higher quality of video, e.g. a higher number of frame rate, is needed in order to deliver a satisfactory experience of video streaming to end users. The adjustment of frame rate and/or frame size may occur as part of, or in addition to, the adjustment of encoding bit rate. For example, if the available maximum bit rate is low, there may not be much room for substantial increase of the encoding bit rate, but to compensate, the frame rate may be increased and the frame size may be decreased.

In the case of a low complexity level of the video stream (e.g. still images or near still images shown in consecutive frames), the Encoding Controller 630 may, in response to a decrease in available maximum bit rate, decrease the encoding bit rate, reduce the frame rate, increase the frame size, or any combinations thereof, to maintain perceived video quality.

In some embodiment, the motion estimation technique or analysis may be applied to pre-processed video frames such as scaled video frames.

As noted, Encoder Controller 630 may adjust pre-processing parameters. Adjustable pre-processing parameters may include temporal parameters, such as, for example, the frame rate. So, for example, frame rate may be decreased as available bit rate decreases, and increased as available bit rate increases. Adjustable pre-processing parameters may also include spatial parameters, such as, for example, frame size. So, for example, frame size may be decreased (by scaling down) as available bit rate decreases, and increased as available bit rate increases. Other adjustable pre-processing parameters include, for example, level of noise filtering, whether the video is interlaced or deinterlaced.

Encoder Controller 630 may also adjust encoder parameters, such as an encoder quality parameter (QP), encoding bit-rate of the Adaptive Rate Encoder 614, etc.

Pre-processing parameters and encoder parameters may collectively be referred to as encoding parameters.

Of course, the above noted encoding parameters are examples only, and other parameters apparent to those of ordinary skill in the art may also be adjusted by Encoder Controller 630.

The operation of the system of FIG. 8 is further described with reference to the following example. In this example, in response to a decreasing bit rate, the Encoding Controller 630 elects to decrease the encoding bit rate. However, the resulting encoded frames may fail the fitness test based on the fitness metric determined at the Frame Comparator 240. Encoding Controller 630 then decreases the frame size from 1080p to 720p. The rescaled frames are slightly softer (due to a loss of detail from the reduction in resolution) but allow an increase in encoding bit rate (per pixel) and result in an encoded frame having better visual quality than the failed frame, as would be perceived by a user.

If after the initial adjustment of encoding parameters the fitness test still fails, Encoding Controller 630 makes further adjustments to the encoder and pre-processing parameters, continuing to adapt the encoding to meet the operational requirements. If after comparison, the new frames pass the fitness test, then the tested encoding parameters are selected and normal processing of the encoded frame continues, e.g., the encoded frame may be sent to connection controller 620.

In one embodiment, further adjustments may include an "audio-only" mode if necessary. For example, if after some or all of the techniques described above have been applied, the fitness metric test still fails, a determination may be made not to transmit the video frame. This may be done repeatedly, reducing the frame rate such that only audio data is transmitted.

In some embodiments, failed frames may nonetheless be transmitted, e.g., when there is a demand for low latency. In other embodiments, some (or all) of the failed frames may be discarded, and Encoding Controller 630 may re-encode some (or all) of the failed frames with the selected encoding parameters if latency requirements allow for it.

As noted, Frame Comparator 640 may compare the encoded frame with the source frame before pre-processing and any scaling, or may compare the encoded frame with the source frame after pre-processing and scaling down. As will be appreciated, the latter approach reduces computational load, as the scaled down frame is smaller and thus there is less data to compare, but this may provide a less accurate comparison as it does not account for any reduction in frame quality that may be introduced by Pre-Processor 612.

In some embodiments, Frame Comparator 640 may compare portions of the output frame (re-scaled to the original size) to the source frame (before pre-processing and any scaling). This approach also reduces computational load at the expense of comparison accuracy.

In some embodiments, Frame Comparator 640 may compare frames only when particular pre-defined conditions occur or are satisfied, e.g., when change in predicted available bandwidth decreases beyond a pre-defined amount. Thus, the comparison is used to confirm that the system is transmitting video data at an acceptable quality after available bandwidth has dropped.

In some embodiments, the comparison process of Frame Comparator 640 may be off-loaded to an interconnected computing device (e.g., a server). The interconnected computing device may be a remote device interconnected by way of a network. Similarly, the comparison process may also be off-loaded to a cloud-based service. This reduces the local computational burden, but requires additional bandwidth and may increase processing delay (e.g., associated with transmitting data to a remote server or the cloud for comparison and receiving the comparison result).

As will be appreciated, reducing the computational requirements of comparisons facilitates implementation of the present systems and methods on devices with lower computational resources, e.g., smart phones, tablet computers, laptop computers, or the like.

In some embodiments Frame Comparator 640 may utilize any combination of the above-described comparison methods and may dynamically select an appropriate method depending on available computational resources and/or bandwidth.

In an aspect, systems and methods disclosed herein allow encoding to be performed while taking into account feedback regarding encoded video quality. Such feedback may generated automatically, based on an objective analysis of a visual quality of the encoded video stream, e.g., by calculating a fitness metric as described above. In the depicted embodiments, an objective analysis is performed by comparing encoded video images with reference images (e.g., the images prior to encoding and in some cases prior to pre-processing). However, in other embodiments, an objective analysis may be performed without comparing encoded video images with any reference images. Instead, the objective analysis may be performed by analyzing the encoded video to obtain metrics of video quality such as, for example, metrics reflective of a degree of discernable macroblocking in the images, a degree of sharpness in the images, a degree of detail in the images, or the like.

Other forms of objective analyses of visual quality may also be used. Of course, different forms of objective analyses may also be combined, and feedback from multiple forms of objective analyses may be used in combination to control encoding. Compared to systems and methods that perform encoding without taking into account feedback regarding encoded video quality, visual quality of the encoded video may be improved.

In another aspect, feedback regarding encoded video quality may be used to determine minimum transmission bit rates that may be used while meeting a required quality of the encoded video. For example, bit rates may be progressively decreased until the quality of the video, e.g., as measured using a fitness metric, falls below a pre-defined threshold. Conveniently, determining minimum acceptable transmission bit rates may allow costs associated with network usage to be reduced. For instance, service providers for cellular networks may charge for usage by the megabyte (MB), and audio/video streams generate a large amount of data. So, any reduction in total transmitted data may significantly reduce network usage costs.

In a further aspect, feedback regarding encoded video quality may be used to improve resource sharing in circumstances where multiple transmitters at a single location must share a set of connected networks in order for each to transmit their own audio/video stream to their respective home network. For example, each transmitter may transmit audio/video at minimally acceptable transmission bit rates that provide a required level of visual quality. The required level of visual quality may vary from transmitter to transmitter.

In a yet further aspect, feedback regarding encoded video quality may be used to determine optimal encoding parameters given a set of operator-specified transmission and video quality parameters. For example, an operator may specify that the best and most stable image quality possible is desired, for no more than 8 second glass to-glass latency and better than standard definition visual quality. An audio/visual stream meeting these requirements may be automatically delivered without further operator configuration or intervention.

Embodiments are described herein with reference to feedback regarding encoded video quality. However, other forms of feedback regarding other aspects of an encoded data stream (e.g., audio quality) may also be generated, and provided to an encoder to automatically adjust encoding parameters.

In the preceding description, for purposes of explanation, numerous details are set forth in order to provide a thorough understanding of the embodiments. However, it will be apparent to one skilled in the art that these specific details may not be required in cell embodiments. In other instances, well-known electrical structures and circuits are shown in block diagram form in order not to obscure aspects of the embodiments. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope of this disclosure, which is defined solely by the claims appended hereto.

What is claimed is:

1. A system for transmission of a video stream across a plurality of connected networks as individual data streams, each of the networks having a corresponding available bandwidth, the system comprising:
- a processor operating in conjunction with non-transitory computer memory configured to:
  - encode frames of the video stream for generating the individual video streams according to at least one encoding parameter for each network of the plurality of connected networks derived based on a predicted available bandwidth available across all of the plurality of connected networks;
  - detect a change in the predicted available bandwidth determined from feedback data corresponding to said each network;
  - receive data indicative of the corresponding available bandwidth for said each network of the plurality of connected networks over which the video stream is transmitted; and
  - adjust the at least one encoding parameter for each of the individual video streams based on the corresponding available bandwidth of said each corresponding network by adjusting the at least one encoding parameter to optimize visual quality of the video stream determined based at least on the corresponding available bandwidth of said each network of the plurality of networks.

2. The system of claim 1, wherein the at least one encoding parameter is adjusted to allocate more bandwidth to a mobile device for transmission of the corresponding individual video stream.

3. The system of claim 1, further comprising a pre-processor that processes frames prior to encoding, and wherein the input frames are provided to the processor from the pre-processor.

4. The system of claim 3, wherein the input frames are scaled versions of frames captured by a video capture device.

5. The system of claim 1, wherein the change detected in the predicted available bandwidth is a change value beyond a threshold value such that the adjustment of the at least one encoding parameter is triggered only when the threshold value is exceeded.

6. The system of claim 1, wherein the processor applies at least one of Structural Similarity (SSIM), Peak Signal to Noise Ratio (PSNR), Mean Squared Error (MSE), and Multi-Scale SSIM (MS-SSIM) to estimate the visual quality of the video stream.

7. The system of claim 1, wherein the at least one encoding parameter comprises one or more of a frame rate, an encoding rate and a frame size.

8. The system of claim 1, wherein the processor is adapted to adjust the at least one encoding parameter based on a complexity level of the video stream.

9. The system of claim 8, wherein the complexity level of the video stream is determined based on motion estimation analysis of the input frames of the video stream.

10. A method for transmitting a video stream across a plurality of connected networks as individual video streams, each of the networks having a corresponding available bandwidth, the method comprising:
- encoding frames of the video stream for generating the individual video streams according to at least one encoding parameter for each network of the plurality of connected networks derived based on a predicted available bandwidth available across all of the plurality of connected networks;
- detecting a change in the predicted available bandwidth determined from feedback data corresponding to each network;
- receiving data indicative of the corresponding available bandwidth for said each network of the plurality of connected networks over which the video steam is transmitted; and
- adjusting the at least one encoding parameter for each of the individual video streams based on the available bandwidth of the corresponding network, by adjusting the at least one encoding parameter optimize visual quality of the video stream determined based at least on the corresponding available bandwidth of said each network of the plurality of networks.

11. The method of claim 10, further comprising:
- at least one encoding parameter is adjusted to allocate more bandwidth to a mobile device for transmission of the corresponding individual video stream.

12. The method of claim 10, wherein the detecting of the change in the predicted available bandwidth occurs only when the change in predictive available bandwidth is beyond a threshold value.

13. The method of claim 10, further comprising:
- pre-processing the input frame, the pre-processing comprising scaling the input frame.

14. The method of claim 10, wherein the visual quality of the video stream is determined based on at least one of Structural Similarity (SSIM), Peak Signal to Noise Ratio (PSNR), Mean Squared Error (MSE), and Multi-Scale SSIM (MS-SSIM).

15. The method of claim 10, wherein the at least one encoding parameter comprises one or more of a frame rate, an encoding rate and a frame size.

16. The method of claim 10, further comprising adjusting the at least one encoding parameter based on a correlated parameter.

17. The method of claim 16, wherein the correlated parameter is a packet loss rate.

18. The method of claim 10, further comprising adjusting the at least one encoding parameter based on a maximum bit rate.

19. The method of claim 10, further comprising adjusting the at least one encoding parameter based on a complexity level of the video stream.

20. The method of claim 19, wherein the complexity level of the video stream is determined based on motion estimation analysis of the input frames of the video stream.

* * * * *